United States Patent [19]

Lawrence et al.

[11] Patent Number: 4,980,835
[45] Date of Patent: Dec. 25, 1990

[54] CONTROL LAW SYSTEM FOR X-WING AIRCRAFT

[75] Inventors: Thomas H. Lawrence, Derby; Phillip J. Gold, Shelton, both of Conn.

[73] Assignee: United Technologies Corporation, Hartford, Conn.

[21] Appl. No.: 256,937

[22] Filed: Oct. 13, 1988

[51] Int. Cl.$^5$ .............................................. B64C 27/12
[52] U.S. Cl. ................................ 364/434; 416/20 R; 416/90 A; 244/17.11
[58] Field of Search .................... 364/424.01, 433, 434; 318/564, 565; 416/20 A, 20 R, 90 A, 90 R, 158; 244/17.11, 17.13, 17.25

[56] References Cited

U.S. PATENT DOCUMENTS

| | | | |
|---|---|---|---|
| 4,493,612 | 1/1985 | D'Anna | 416/20 R |
| 4,507,050 | 3/1985 | Jeffrey et al. | 416/90 A |
| 4,534,702 | 8/1985 | Johnson, Jr. et al. | 416/20 R |
| 4,573,871 | 3/1986 | Krauss et al. | 416/20 R |
| 4,583,704 | 4/1986 | Krauss et al. | 244/17.11 |
| 4,594,537 | 6/1986 | Arifian et al. | 318/564 |
| 4,596,512 | 6/1986 | Krauss et al. | 416/42 |
| 4,626,171 | 12/1986 | Carter, Sr. et al. | 416/90 A |
| 4,678,401 | 7/1987 | Bradford et al. | 416/32 |

Primary Examiner—Gary Chin

[57] ABSTRACT

Control law system for the collective axis, as well as pitch and roll axes, of an X-Wing aircraft and for the pneumatic valving controlling circulation control blowing for the rotor. As to the collective axis, the system gives the pilot single-lever direct lift control and insures that maximum cyclic blowing control power is available in transition. Angle-of-attach de-coupling is provided in rotary wing flight, and mechanical collective is used to augment pneumatic roll control when appropriate. Automatic gain variations with airspeed and rotor speed are provided, so a unitary set of control laws works in all three X-Wing flight modes. As to pitch and roll axes, the system produces essentially the same aircraft response regardless of flight mode or condition. Undesirable cross-couplings are compensated for in a manner unnoticeable to the pilot without requiring pilot action, as flight mode or condition is changed. A hub moment feedback scheme is implemented, utilizing a P+I controller, significantly improving bandwidth. Limits protect aircraft structure from inadvertent damage. As to pneumatic valving, the system automatically provides the pressure required at each valve azimuth location, as dictated by collective, cyclic and higher harmonic blowing commands. Variations in the required control phase angle are automatically introduced, and variations in plenum pressure are compensated for. The required switching for leading, trailing and dual edge blowing is automated, using a simple table look-up procedure. Non-linearities due to valve characteristics of circulation control lift are linearized by map look-ups.

39 Claims, 18 Drawing Sheets

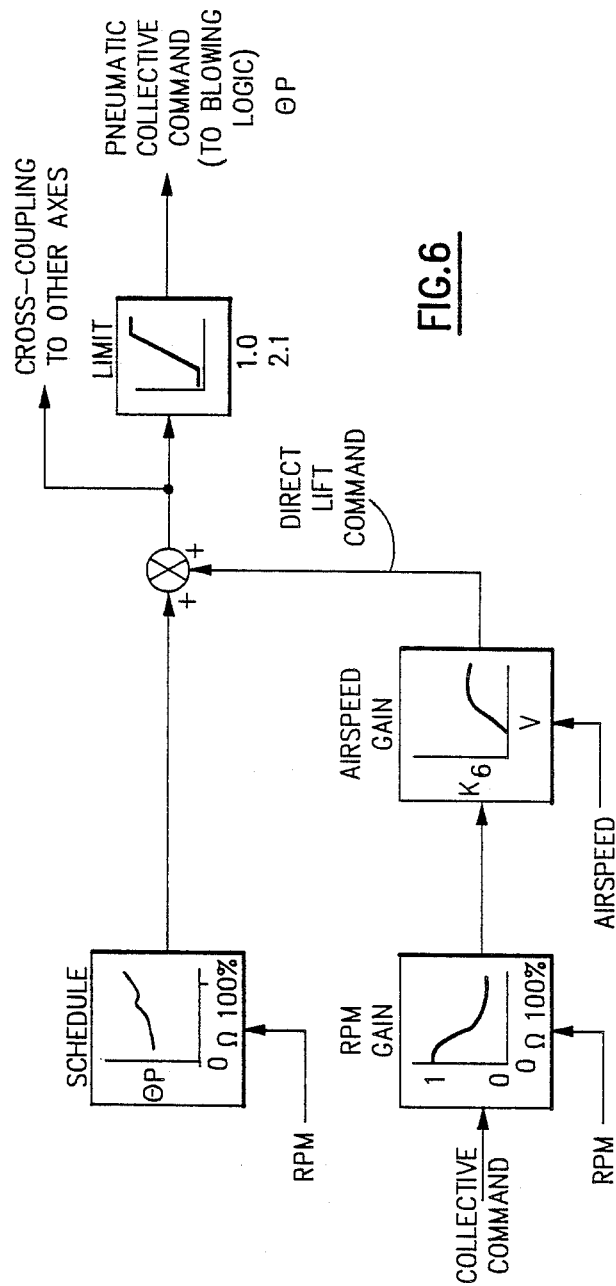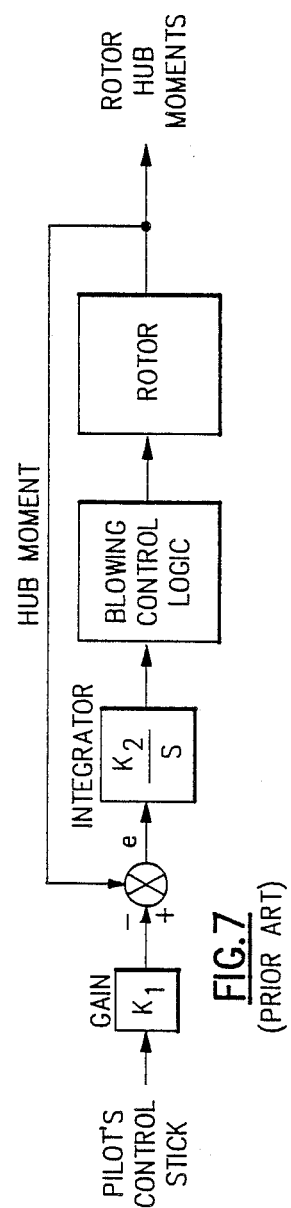
FIG.6
FIG.7 (PRIOR ART)

- LEADING EDGE BLOWING LOGIC

THIS LOGIC DETERMINES
THE AZIMUTH AT WHICH
LEADING EDGE BLOWING
IS TURNED ON (LEBS)
AND OFF (LEBE).

IF $\mu \leq$ LEBRMR
SET ALEB = 0.0
IF NOT, CALCULATE:

$$ALEB = TAN^{-1}\sqrt{\frac{\mu}{LEBRMR} - 1.0} \text{ , DEGREES}$$

THEN CALCULATE

LEBSMR = $-90$ $-$ ALEB , DEGREES
LEBEMR = $-90$ $+$ ALEB , DEGREES

- TRAILING EDGE SHUTDOWN LOGIC

THIS LOGIC DETERMINES
THE AZIMUTH AT WHICH
TRAILING EDGE BLOWING IS
SHUT-
DOWN (TEBE) AND
TURNED ON AGAIN (TEBS)

IF $\mu \leq$ TEBRMR
SET ATEB = 0.0
IF NOT, CALCULATE:

$$ATEB = TAN^{-1} \sqrt{\frac{\mu}{TEBRMR} - 1.0} \text{ , DEGREES}$$

THEN CALCULATE

TEBEMR = $-90$ $-$ ATEB , DEGREES
TEBSMR = $-90$ $+$ ATEB , DEGREES

FIG. 19A

LEB FLAG TABLE

| VALVE | AZIMUTH LOCATION | ADVANCE RATIO | | | | | | |
|---|---|---|---|---|---|---|---|---|
| | | 0 → 0.509 | 0.509 → 0.586 | 0.586 → 0.794 | 0.794 → 1.349 | 1.349 → 3.414 | 3.414 → 29.348 | 29.348 → 60.0 |
| 1 | 7.5 | 0 | 0 | 0 | 0 | 0 | 0 | 0 |
| 2 | 22.5 | 0 | 0 | 0 | 0 | 0 | 0 | 0 |
| 3 | 37.5 | 0 | 0 | 0 | 0 | 0 | 0 | 0 |
| 4 | 52.5 | 0 | 0 | 0 | 0 | 0 | 0 | 0 |
| 5 | 67.5 | 0 | 0 | 0 | 0 | 0 | 0 | 0 |
| 6 | 82.5 | 0 | 0 | 0 | 0 | 0 | 0 | 0 |
| 7 | 97.5 | 0 | 0 | 0 | 0 | 0 | 0 | 0 |
| 8 | 112.5 | 0 | 0 | 0 | 0 | 0 | 0 | 0 |
| 9 | 127.5 | 0 | 0 | 0 | 0 | 0 | 0 | 0 |
| 10 | 142.5 | 0 | 0 | 0 | 0 | 0 | 0 | 1 |
| 11 | 157.5 | 0 | 0 | 0 | 0 | 1 | 1 | 1 |
| 12 | 172.5 | 0 | 1 | 1 | 1 | 1 | 1 | 1 |
| 13 | 187.5 | 0 | 1 | 1 | 1 | 1 | 1 | 1 |
| 14 | 202.5 | 0 | 0 | 1 | 1 | 1 | 1 | 1 |
| 15 | 217.5 | 0 | 0 | 0 | 1 | 1 | 1 | 1 |
| 16 | 232.5 | 0 | 0 | 0 | 1 | 1 | 1 | 1 |
| 17 | 247.5 | 0 | 0 | 0 | 0 | 1 | 1 | 1 |
| 18 | 262.5 | 0 | 0 | 0 | 0 | 0 | 1 | 1 |
| 19 | 277.5 | 0 | 0 | 0 | 0 | 0 | 0 | 1 |
| 20 | 292.5 | 0 | 0 | 0 | 0 | 0 | 0 | 1 |
| 21 | 307.5 | 0 | 0 | 0 | 0 | 0 | 0 | 1 |
| 22 | 322.5 | 0 | 0 | 0 | 0 | 0 | 0 | 1 |
| 23 | 337.5 | 0 | 0 | 0 | 0 | 0 | 0 | 1 |
| 24 | 352.5 | 0 | 0 | 0 | 0 | 0 | 0 | 1 |

Valves 1–12: ADVANCING SIDE
Valves 13–24: RETREATING SIDE

TEB FLAG TABLE

| VALVE | AZIMUTH LOCATION | 0→ 1.017 | 1.017→ 1.172 | 1.172→ 1.589 | 1.589→ 2.698 | 2.698→ 6.828 | 6.828→ 58.695 | 58.695→ 60.0 |
|---|---|---|---|---|---|---|---|---|
| 1 | 7.5 | 1 | 1 | 1 | 1 | 1 | 1 | 1 |
| 2 | 22.5 | 1 | 1 | 1 | 1 | 1 | 1 | 1 |
| 3 | 37.5 | 1 | 1 | 1 | 1 | 1 | 1 | 1 |
| 4 | 52.5 | 1 | 1 | 1 | 1 | 1 | 1 | 1 |
| 5 | 67.5 | 1 | 1 | 1 | 1 | 1 | 1 | 1 |
| 6 | 82.5 | 1 | 1 | 1 | 1 | 1 | 1 | 1 |
| 7 | 97.5 | 1 | 1 | 1 | 1 | 1 | 1 | 1 |
| 8 | 112.5 | 1 | 1 | 1 | 1 | 1 | 1 | 1 |
| 9 | 127.5 | 1 | 1 | 1 | 1 | 1 | 1 | 1 |
| 10 | 142.5 | 1 | 1 | 1 | 1 | 1 | 1 | 1 |
| 11 | 157.5 | 1 | 1 | 1 | 1 | 1 | 1 | 1 |
| 12 | 172.5 | 1 | 1 | 1 | 1 | 1 | 1 | 1 |
| 13 | 187.5 | 1 | 1 | 1 | 1 | 1 | 0 | 0 |
| 14 | 202.5 | 1 | 1 | 0 | 0 | 0 | 0 | 0 |
| 15 | 217.5 | 1 | 0 | 0 | 0 | 0 | 0 | 0 |
| 16 | 232.5 | 1 | 0 | 0 | 0 | 0 | 0 | 0 |
| 17 | 247.5 | 1 | 1 | 0 | 0 | 0 | 0 | 0 |
| 18 | 262.5 | 1 | 1 | 1 | 0 | 0 | 0 | 0 |
| 19 | 277.5 | 1 | 1 | 1 | 0 | 0 | 0 | 0 |
| 20 | 292.5 | 1 | 1 | 1 | 1 | 0 | 0 | 0 |
| 21 | 307.5 | 1 | 1 | 1 | 1 | 0 | 0 | 0 |
| 22 | 322.5 | 1 | 1 | 1 | 1 | 0 | 0 | 0 |
| 23 | 337.5 | 1 | 1 | 1 | 1 | 1 | 0 | 0 |
| 24 | 352.5 | 1 | 1 | 1 | 1 | 1 | 1 | 0 |

ADVANCING SIDE (valves 1–12) / RETREATING SIDE (valves 13–24)

FIG. 19B

CONTROL LAW SYSTEM FOR X-WING AIRCRAFT

The invention described herein was made in the performance of work under NASA Contract No. NAS2-11771 and is subject to the provisions of Section 305 of the National Aeronautics and Space Act of 1958 (72 Stat. 435; 42 U. S. C. 2457).

CROSS REFERENCE TO RELATED APPLICATIONS

This application relates to some of the same subject matter as the following two applications, both of which were filed concurrently with this application and the disclosures of which are incorporated herein by reference.

Ser. No. No. 07/257,474 entitled "X-Wing Fly-By-Wire Vehicle Management System" by William C. Fischer; and Ser. No. No. 07/257,473 entitled "Higher Harmonic Control System for X-Wing Aircraft" by William C. Fischer and Kenneth C. Arifian.

TECHNICAL FIELD

This invention relates to "X-Wing" aircraft and more particularly to a control law system for controlling the aircraft. More particularly the present invention relates to a control law system for the collective axis and for the pitch and roll axes for such an aircraft and for the pneumatic valving that controls the edge blowing for the rotor of such an aircraft.

GENERAL BACKGROUND

Introduction

An X-Wing aircraft is a rotary wing aircraft that uses a rigid rotor/wing utilizing circulation control airfoils. The rotor is driven mechanically, and the rotor may rotate, as in a helicopter, or it may be stopped and positioned so as to act like a fixed wing.

Collective and cyclic control is achieved by control of air flowing around a Coanda surface on the blade airfoils. This is done by blowing compressed air through leading edge and trailing edge ducts in the rotor blades and modulating the amount of air being ejected through span-wise slots on the leading and trailing edges of the rotor blades.

The rotor system for an X-Wing aircraft includes a hub and attached rotor blades and a pneumatic system for delivering pressurized air separately to the leading edge and the trailing edge of the individual rotor blades at a desired pressure and mass flow. The pneumatic system includes a compressor, a stationary air supply chamber, valving for controlling the flow of air from the chamber to the blades, and a rotating air distribution arrangement for conducting air separately to the leading edge and trailing edge of the blades.

In circulation control airfoils, pressurized air is ejected from span-wise openings or slots along the upper side of the rounded airfoil leading/trailing edge Coanda surface. The airflow from the slots attaches to the rounded leading/trailing edge, which increases the circulation, to provide a corresponding lift increase over an airfoil having no ejected air. For a given blade internal pressure and aerodynamic condition, the lift change due to circulation control is proportional to the area of the slot opening up to a certain limit. When the slot opening exceeds this limit, no additional lift is achieved, a condition analogous to a stall in a conventional airfoil.

Since an X-Wing circulation control airfoil is symmetrical about its half chord, the leading edge on the advancing side of the blade path disk becomes the trailing edge on the retreating side, and vice-versa. To maximize performance as the rotor slows down, it is desirable that the "local" leading edge slot be closed at all azimuth positions.

Conventional helicopters provide aircraft pitch and roll control by varying blade pitch from medium-to-high, or medium-to-low to medium at a once "per rev" (rotor revolution) rate, as the blades whirl around the rotor disk. The X-Wing aircraft includes 1-per-rev pneumodynamic control and also has more rapid pneumatic variance, at an up to 5-per-rev rate, to system loads and vibrations.

It achieves rotor control via a pneumatic medium. It is a full authority fly-by-wire (FBW) system with, for example, quadruple redundancy for all flight critical functions.

The X-Wing aircraft is designed to hover like a helicopter and cruise at an airplane's high speeds. It uses a stoppable rotor/wing, which, as noted, rotates like a helicopter rotor in low speed flight and stops to become a fixed wing for high speed cruise. It offers an ideal compromise for VTOL hover/cruise capabilities, horsepower/fuel efficiency and ultimate payload capacity.

Some exemplary X-Wing related patents, all owned by the assignee hereof, are listed below:

| Patent No. | Patentee(s) | Issue Date | Title |
| --- | --- | --- | --- |
| 4,493,612 | D'Anna | 01/15/85 | |
| "Axially Slideable Plenum for Circulation Control Aircraft" | | | |
| 4,507,050 | Jeffery et al | 03/26/85 | |
| "Pneumatic Valve Control for Circulation Control Aircraft" | | | |
| 4,534,702 | Johnson et al | 08/13/85 | |
| "Pneumatic Control Valve Actuator Computer Control Arrangement" | | | |
| 4,573,871 | Krauss et al | 03/04/86 | |
| "X-Wing Aircraft Circulation Control" | | | |
| 4,583,704 | Krauss et al | 04/22/86 | |
| "Pneumatic System Structure for Circulation Control Aircraft" | | | |
| 4,594,537 | Arifian et al | 06/10/86 | |
| "Redundant Control System for X-Wing Value Actuators" | | | |
| 4,596,512 | Krauss | 06/24/512 | |
| "Circulation Controlled Rotor Blade Tip Vent Value" | | | |
| 4,626,171 | Carter et al | 12/02/86 | |
| "Rotor Blade Construction for Circulation Control Aircraft" | | | |
| 4,678,401 | Bradford et at | 07/07/87 | |
| "Rotor Control System" | | | |

A revolutionary concept such as "X-Wing" requires innovative approaches to service the technology leap involved in this type of hybrid aircraft.

The control laws are one area of such a vehicle which face significant challenges. The control law system must first be designed to accommodate the equivalent of three vehicles, since the X-Wing operates in a rotary wing mode (RW), a fixed wing or stopped rotor mode (SR), and a conversion state (CV) between the two.

For purposes of this disclosure, it should be understood that the phrase "flight mode" refers to the state of the rotor, including its stopped rotor mode (SR), its rotary wing mode (RW) and the conversion state (CV), while "flight condition" refers to aircraft air speed and the angle of attack (AOA). In turn, "flight situation" refers to both rotor mode and aircraft condition.

Collective Axis

An X-Wing rotor employs both mechanical collective pitch and pneumatic collective blowing. Collective pitch changes the pitch angle on all the blades equally and simultaneously, in the conventional helicopter way. Pneumatic collective blowing is the average pressure seen by all of the blades.

Changes in pneumatic collective cause an increase or decrease in rotor lift in all flight modes, i.e., rotary wing (RW), conversion (CV) and stopped rotor (SR) modes. While pneumatic collective provides for direct lift control, large variations can cause undesirable cross-coupling with pitch and roll control.

Pitch and roll control on the X-Wing rotor is achieved by varying the pressure azimuthally on the rotor blades. This is true in all flight modes, but for convenience the discussion immediately below will be limited to the rotary wing state. In RW mode, blade pressure is varied around the azimuth, as shown in FIG. 1. In this case, the highest blowing is at, for example, ninety degrees (90°) and the lowest at, for example, two hundred and seventy degrees (270°), producing a left rolling moment. The average or collective pressure ratio is, for example, one and a half (1.5), and the cyclic variation is plus or minus three-tenths (+0.3).

If, however, the collective pressure ratio is increased to, for example, one and eight-tenths (1.8) the commanded pressure wave will be clipped, as shown in FIG. 2. This situation is called saturation, since higher pressure ratios at certain azimuth angles cannot be achieved because of compressor limits.

An analogous situation exists if the collective pressure ratio is reduced, to, for example, one and two-tenths (1.2), as illustrated in FIG. 3. In this case, the bottom of the desired pressure ratio curve is clipped, because pressure ratios less than one can not be achieved.

Saturation of the blowing results in two undesirable effects. First, the desired moment is not produced, because only one side of the disk is performing correctly. Secondly, a change in lift is produced. When the blowing is not saturated, the reduction in lift on one side of the disk is compensated for by the increase on the other side. In this way, the lift is not strongly effected by cyclic blowing. If the cyclic blowing is saturated, this compensatory effect is reduced and changes in rotor thrust result.

The foregoing also applies in conversion and stopped rotor flight modes. Of course, in stopped rotor mode the blades are at a fixed azimuth, and cyclic variations in pressure are replaced by differential blowing forward to aft and right to left. But the same effect takes place.

The effect of mechanical collective pitch on rotor loads varies greatly, depending on the flight mode and airspeed. In hover, collective pitch changes result in large changes in rotor lift. As airspeed increases, variations in the collective pitch produce pitch and roll movements, as well as lift changes. At still higher airspeeds, the primary effect of collective pitch is to generate large rolling movements. In stopped rotor and conversion flight modes, mechanical collective is primarily a rolling moment generator. In fact, a basic reason for adding mechanical collective pitch to the X-Wing is to use it to provide roll trim in high speed rotary wing flight.

Pitch & Roll Axes

An X-Wing rotor produces pitch and roll moments by varying the pressure at the blade root to change blade lift. Higher pressure creates more lift, and lower pressure reduces lift. In RW mode, the pressure is varied azimuthally in a sinusoidal fashion, as discussed in the collective axis section. This sinusoidal pressure variation is analogous to the cyclic pitch variation used on conventional helicopter rotors. In SR mode, control in pitch and roll is achieved by differential fore-to-aft and right-to-left pressures, respectively.

From the point of view of flying qualities, the major problem is that a given amount of pressure variation creates different loads, depending on flight condition and rotor speed. If the flight controls produce the same pressure variation for a given stick input, then the aircraft response to that stick input will vary, depending on aircraft flight condition and rotor speed. These variations can be very significant and make the aircraft more difficult to fly, leading to high pilot workload.

In RW mode, the X-Wing rotor experiences very high gyroscopic cross-coupling. This is due to the extreme stiffness of the blades and their attachment to the hub. For a rotor with conventional rotation (that is, with the advancing side of disk to starboard) nose up pitch rates generate right rolling moments, and right roll rates produce nose down pitching moments. This type of cross-coupling makes the aircraft very difficult to fly and must be compensated for. In addition, an aerodynamic cross-coupling exists such that positive angle-of-attack changes produce a left rolling moment. This can be compensated for by angle-of-attack to mechanical collective pitch feedback, as discussed in the collective axis section below.

One important concern is limiting the hub moments produced. Under some conditions, the hub moments generated can be excessive and lead to structural damage. For example, when the aircraft is on the ground, large hub moments can not be relieved by aircraft motion (as they can be in the air), and damage or an accident can result.

Pneumatic Valving

In a typical x-wing control system, pilot's stick commands are converted to mechanical collective pitch and collective, pitch and roll blowing commands. These blowing commands, however, must be implemented by some form of valving. Therefore, there is a requirement for pneumatic valve control laws for controlling the rotor of the X-Wing aircraft.

In addition to providing an azimuthal pressure variation to accommodate collective and cyclic commands, the valve control logic must also include provisions for higher harmonic control (HHC) in rotary wing mode. HHC is the application of pressure variations that occur at two, three, four and five times per rotor revolution for the purpose of vibration reduction. The control laws which create the HHC commands are not covered here, but see the concurrently filed patent application entitled "Higher Harmonic Control System for X-Wing Aircraft" (S-4208) referred to above.

Another important requirement for the valving is providing for selection of trailing edge blowing (TEB), leading edge blowing (LEB) or dual edge blowing (DEB), depending on rotor speed, airspeed and blade azimuth position. The reason for this is due to the differences in the airflow over the rotor blades, as the rotor changes from rotary wing to stopped rotor modes.

In the rotary wing mode, air is ejected from thin slots on the trailing edge of each blade, as generally shown in FIG. 13 (on the left side). In the stopped rotor mode (right side of figure), however, air is ejected from the trailing edge slots on the starboard wings, but from the leading edge slots on the port side. Note that the "trailing" and "leading" edges are being defined here in the rotary wing way. During conversion, then, as the rotor is stopped or started in flight, the blowing logic has select the appropriate slots that should be blown.

The way this is done is shown in the sequential diagrams in FIG. 14. In rotary wing mode blowing is out of the trailing edges only (1st diagram; mu=0). As the rotor is slowed down, dual blowing (both slots) is introduced on the retreating (port) side by turning the LEB on over a small azimuth (2nd diagram; mu=0.5). As the rotor speed decreases further, the azimuth over which dual blowing is employed, increases (3rd diagram; mu=0.8).

With further reduction in rotor speed, a central region of leading edge blowing is introduced on the port side by turning off the TEB, flanked by regions of dual blowing (4th diagram; mu=1.5). At very low RPM's the region of LEB covers most of the retreating side, with small dual blowing regions fore and aft (6th diagram; mu=3.0).

Finally, when the rotor is stopped, the blowing is TEB on the starboard side and LEB on the port side, as required (6th diagram). When the rotor converts from stopped to rotating, the same process is followed but in the reverse order.

The above discussion referred to reduction in rotor speed as controlling the blowing edge state. In actuality, the true governing parameter is the advance ratio (mu), that is the ratio of the flight velocity divided by the tip speed. Typically, dual blowing preferably starts at an advance ratio of, for example, one-half (0.5), and leading edge blowing only is introduced at an advance ratio of, for example, one (1.0). Thus, in high speed rotary wing flight a small region of dual blowing may exist before the conversion to the stopped rotor mode is started or at the end of a conversion from stopped rotor to rotary wing.

PARTICULAR BACKGROUND ART

Collective, Pitch and Roll Axes Control

As noted above, X-Wing and other circulation control rotors employ both mechanical collective pitch and pneumatic collective blowing. Historically, pilot activation at these two collectives has employed two different controls, typically a conventional collective lever and a beeper switch. This obviously makes the piloting task more difficult.

In addition, since the effect of mechanical collective varies greatly, depending on flight mode and airspeed, the pilot ends up with one control which does very different things at different times. For example, if collective pitch is controlled by a conventional helicopter collective lever, the pilot gets an appropriate response in hover and at low RW speeds. However, in high speed RW flight or in SR flight, moving the collective lever causes large rolling moments. For the pilot, this is an unnatural response.

On the other hand, if collective pitch is controlled by a lateral motion beeper type switch on the cyclic lever, the rolling moment response noted above is natural. But in hover, moving the beeper laterally results in strong lift changes—again, an unnatural response from the pilot's point of view.

Existing X-Wing designs normally employ mechanical collective as a roll trim device and utilize pneumatic collective for direct lift control. However, rigid rotor helicopters (like the X-Wing) experience a large nose-up pitching moment, as they transition from hover to forward flight. This moment is generally at a maximum between, for example, twenty (20) knots and sixty (60) knots forward airspeeds. As the rotor moves into this transition speed range, a significant amount of extra lift is produced by the inflow to the rotor. To maintain lift trim, pneumatic collective is reduced. However, large amounts of longitudinal cyclic blowing are required for pitch control. As a result, the blowing will saturate, as noted above. In this event, pitch control may be lost.

In rotary wing mode, at high speeds (typically greater than 100 knots) changes in rotor angle-of-attack result in very large rolling moments being produced. A change in angle-of-attack can either be the result of a deliberate pilot action, such as a pull-up, or the result of atmospheric gusts. In either case, the rolling moment is very undesirable and may be so large that lateral cyclic blowing cannot control it.

Analytical and wind tunnel data show that the optimal value of pneumatic collective is different in rotary wing ("RW") and stopped rotor ("SR") modes. In RW, the best collective pressure ratio is between, for example, 1.5 and 1.6, while in SR the best value is around 1.4. In existing designs, this change has to be accommodated manually by the pilot. In addition, during conversion, the rotor loses lift at advance ratios of around, for example, 0.8 to 1.0, corresponding to rotor speeds around eighty (80%) percent. To maintain lift trim, the pneumatic collective needs to be increased in this RPM region.

Prior X-Wing control laws have attempted to solve the problems outlined above for the pitch and roll axes control by use of hub moment feedback (HMF). This basic concept is illustrated in FIG. 7.

The pilot's stick input compared to the actual rotor hub moment, and the error was integrated. This signal was fed to the blowing logic, which adjusted the blade root pressures and changed the rotor hub moment. The feedback loop assured that this continued until the desired moment was reached. Implemented in this fashion, the control was an acceleration command system, which is very difficult to fly.

The control system in FIG. 1 can be converted to a rate command system by adding angular rate feedback as shown in FIG. 8. Stick inputs generate an error signal which is integrated to produce blowing commands. They adjust the pressure distribution on the rotor to produce a moment in the appropriate direction. Once the moment exists, the aircraft begins to respond, producing angular rate. In addition, the aircraft experiences aerodynamic damping, which reduces the applied moment. The aircraft achieves a steady state condition, when the aerodynamic damping cancels the applied hub moment and the angular rate feedback cancels the stick input.

While the HMF of the prior art is generally a good approach for X-Wing control, it has a number of deficiencies if implemented as shown in FIG. 8. First, the actual hub moment being measured and fed back has a high vibratory content in RW mode. These vibrations can be filtered electronically from the feedback signal, but this introduces lags in the steady moment portion of the signal. In addition, the HMF integrator must have a fairly long time constant in order for the system to be stable. As a result, the HMF system typically has a bandwidth of one Hertz or less. Detailed mathematical analyses have shown that such an X-Wing control system is too sluggish for practical use.

Pneumatic Valving

Prior pneumatic valve control schemes for X-Wing aircraft have been implemented with mechanical linkages. These systems were able to provide only collective, cyclic and two per revolution (2/rev.) blowing control. In addition, any non-linearities of blade root pressure to valve position could not be compensated for.

The approach of the invention to X-Wing pneumatic control is to use a large number of valves in the stationary frame, controlled in a fly-by-wire (FBW) way. Large numbers of valves are needed to provide fidelity in the higher harmonic control, which requires inputs up to, for example, five per revolution (5/rev.). Use of FBW allows for control by sophisticated algorithms, which can allow for variation in control phase angle, account for nonlinearities in valve characteristics and provide for failure monitoring and correction.

Current designs employ twenty-four (24) equally spaced valves for TEB control and twenty-four (24) for LEB. For further details on an exemplary valving subsystem, note U.S. Pat. No. 4,507,050 of Jeffery & Lawrence entitled "Pneumatic Valve Control for Circulation Control Aircraft" noted above. Butterfly valves are used, since they are "self-storing". Other types of valves, such as, for example, gate valves, require room to move into when open, and this greatly complicates the design of the blowing manifold.

One feature of any stationary valving scheme is that certain valves may be inactive (closed) for long periods of time. For example, in low speed rotary wing flight, none of the LEB valves are open. Nonetheless, these valves must function properly as the aircraft goes to higher speeds and converts to stopped rotor mode.

DISCLOSURE OF INVENTION

Thus, the present invention provides control laws for the collective axis, as well as for the pitch and roll axes, of an X-Wing aircraft and control laws for the pneumatic valving for controlling the leading and trailing edge blowing for the rotor of an X-Wing aircraft. These will be separately discussed and disclosed below, with some cross-referencing.

The control laws preferably are of a "unified" form with RW, SR and CV mode laws merged into one set. A prime motivation for this is the reduction of the computer throughput demand by computing only one set of control laws, particularly during the already computationally intense conversion phase.

Collective Axis

Thus, one aspect of the present invention is directed to providing a set of collective axis control laws for an X-Wing vehicle.

These give the pilot single-lever direct lift control and insure that the maximum cyclic blowing control power is available in the transitional flight regime. Angle-of-attack de-coupling is provided in rotary wing flight, and mechanical collective may be used to augment pneumatic roll control when appropriate. Automatic gain variations with airspeed and rotor speed are provided, so a unitary set of control laws will work in rotor wing ("RW"), conversion ("CV") and stopped rotor ("SR") modes.

The primary objects of these control laws are to:
(a) provide the pilot with a single lever direct lift control that will provide natural response in all flight modes;
(b) maintain the collective pressure ratio at its mid-value in the transition speed range, so that maximum cyclic blowing control authority is available;
(c) provide a coupling between angle-of-attack and mechanical collective pitch, so that automatic compensation is provided to cancel the rolling moments created by angle-of-attack changes in high speed rotary wing flight;
(d) automatically set the pneumatic collective to its optimal value in RW, CV and SR flight modes; and
(e) cross-couple mechanical collective to lateral stick, so that roll control augmentation is available in RW, CV and SR flight modes.

The exemplary control laws which accomplish the above objectives are described in detail below. For further convenience, the mechanical collective pitch laws and the pneumatic collective laws are described separately. However, of course, they are both part of one collective axis control system. A simplified block diagram of this system is shown in FIG. 4.

As can be seen in FIG. 4, the collective command signal is the sum of the pilot/co-pilot's stick input, the collective stability augmentation system (SAS) and the collective auto-pilot. If the pilot controls are mechanical, there is only one input for the pilot(s). If a fly-by-wire system is utilized, additional pilot-in-command logic is required as shown. This collective command signal is then fed to both the pneumatic collective and collective pitch control laws. Additionally, the mechanical collective control laws receive signals based on the roll axis command, the rotor angle of attack (AOA), the rotor RPM and the vehicle airspeed, while the pneumatic collective control laws receive airspeed and rotor RPM signals.

The collective pitch command is sent to the appropriate actuator, and a signal for cross-coupling to other axes is also available. The pneumatic collective command is sent to the valve control logic, which adjusts the pneumatic control valves (PCV) as required to create the needed pressure at the blade roots. In addition, a pneumatic collective cross-coupling command is available for use by other control axes.

As an alternative, it may be desirable to design an X-Wing aircraft that did not require mechanical collective pitch. In this case the blades would be fastened to the hub directly without any articulation. Such a rotor would be lighter, since no mechanical collective mechanism would be fitted. In addition, it could have less aerodynamic drag since the hub could be smaller, and the hub/blade junction could have improved streamlining.

Such a rotor would still have to compensate for the problems noted above—i.e., providing maximum cyclic blowing control range in the transitional speed regime, compensating for roll moment with airspeed and compensating for roll moments generated by angle-of-attack changes. One possible method for doing this is to blow out of the aerodynamic leading edge slots on the advancing side of the disk. Tests have shown that blowing out only the aerodynamic leading edge spoils the lift generated by the airfoil.

Use of such a technique would obviously require changes in the control laws. Of course, the mechanical collective channel and its interfaces with the other axes would be deleted. The blowing logic would become more complicated, since it would have to turn off TEB and turn on LEB on the advancing side of the disk over some specified azimuth range. This azimuth range would have to be calculated to provide the compensations noted above.

Pitch & Roll Axes

Another aspect of the present invention is directed to providing a set of pitch and roll axes control laws for an X-Wing vehicle.

These pitch and roll axes control laws produce essentially the same aircraft response to pilot input regardless of flight mode or flight condition. Undesirable cross-couplings are compensated for in a manner unnoticed by the pilot and in a way that does not require pilot action, as the flight mode or condition is changed. A hub moment feedback scheme is implemented, but utilizing a proportional plus integral controller, which significantly improves its bandwidth. In addition, hub moment limits are provided so that the structure is protected from inadvertent damage.

The primary objects of these control laws are to.
(a) provide the pilot with a rate command control system in pitch and roll which will produce the same aircraft response to a given stick input regardless of flight mode or flight condition;
(b) provide a control system, which automatically compensates for gyroscopic or control cross-couplings;
(c) provide the pilot with a control system, which provides for sharp and crisp responses to control inputs without sluggishness or unacceptable time delays;
(d) insure that hub moments are automatically limited to prevent structural damage to the aircraft; and
(e) perform the above functions without requiring pilot intervention for selection of flight mode.

The exemplary control laws which accomplish the above objectives are described in detail below. An overview of the pitch and roll axes control system is provided below.

A simplified block diagram of the pitch and roll axes control laws is presented in FIG. 9. The command signal is the sum of the pilot, SAS and auto-pilot inputs. If the pilot controls are mechanical, there is only one input for the pilot(s). If a fly-by-wire system is utilized, additional pilot-in-command logic is required as shown. The pitch and roll command signals are then sent to their respective control laws. Both axes require cross-coupling inputs from the other and from the pneumatic collective, and both use airspeed and rotor speed inputs. The pitch axis control laws also have pitch hub moment, aircraft pitch rate and mechanical cross-coupling inputs. The roll axis control laws also have roll hub moment, aircraft roll rate and yaw cross-coupling inputs.

The outputs are sent to the pneumatic valve control laws.

Pneumatic Valving

A still further aspect of the present invention is directed to providing a set of pneumatic valving control laws for controlling the rotor of an X-Wing vehicle.

These laws automatically provide the pressure required at each valve azimuth location, as dictated preferably by the collective, cyclic and higher harmonic blowing commands. Variations in the required control phase angle are automatically introduced, and variations in plenum pressure are automatically compensated for. The required switching for LEB, TEB and DEB is automated, preferably using a simple table look-up procedure. Non-linearities due to valve characteristics of circulation control lift are linearized, preferably by map look-ups.

The primary objects of these pneumatic valve control laws are to provide control of a large number of pneumatic control valves for an X-Wing rotor that accomplishes the following tasks:
(a) providing azimuthal variations in blade root pressure in accordance with collective, cyclic and higher harmonic blowing commands;
(b) automatically scheduling TEB, DEB and LEB on the retreating side as a function of advance ratio;
(c) automatically compensating for the non-linear relationship between valve position/root pressure, so that the blade root has the desired value;
(d) automatically compensating for the change in cyclic control phase angle required as a function of rotor rotational speed;
(e) providing for a non-linear correction to the blowing to account for the non-linear nature of circulation control lift; and
(f) providing continuous commands to all valves, so that malfunctions can be detected.

The exemplary control laws which accomplish the above objectives are described in detail below.

The foregoing and other features and advantages of the present invention will become more apparent from the following further description and drawings.

BRIEF DESCRIPTION OF DRAWINGS

FIG. 1 is a graph of the blade root pressure ratio versus the azimuthal angle in degrees for the X-Wing rotor in its rotary wing (RW) mode, with the collective pressure ratio at one and a half (1.5); while FIG. 2 is a graph of the blade root pressure ratio versus the azimuth angle in degrees, with the collective pressure ratio raised to one and eight-tenths (1.8), producing saturation above two (2), the compressor limit; while

FIG. 5 is a block diagram schematically illustrating the exemplary embodiment of the mechanical collective control law of the system of the present invention; while FIG. 6 is a block diagram schematically illustrating the exemplary embodiment of the pneumatic collective control law of the system of the present invention.

FIG. 7 is a block diagram schematically illustrating the basic prior art concept of attempting to solve the X-Wing control law problems by the use of hub moment feedback; while

FIG. 9 is a block diagram schematically illustrating the exemplary embodiment of the pitch and roll control laws of the system of the present invention; while

FIGS. 19A and 19B are flag tables for the leading edges and the trailing edges, respectively.

BEST MODE FOR CARRYING OUT THE INVENTION

Mechanical Collective Control Law

Figure 5:
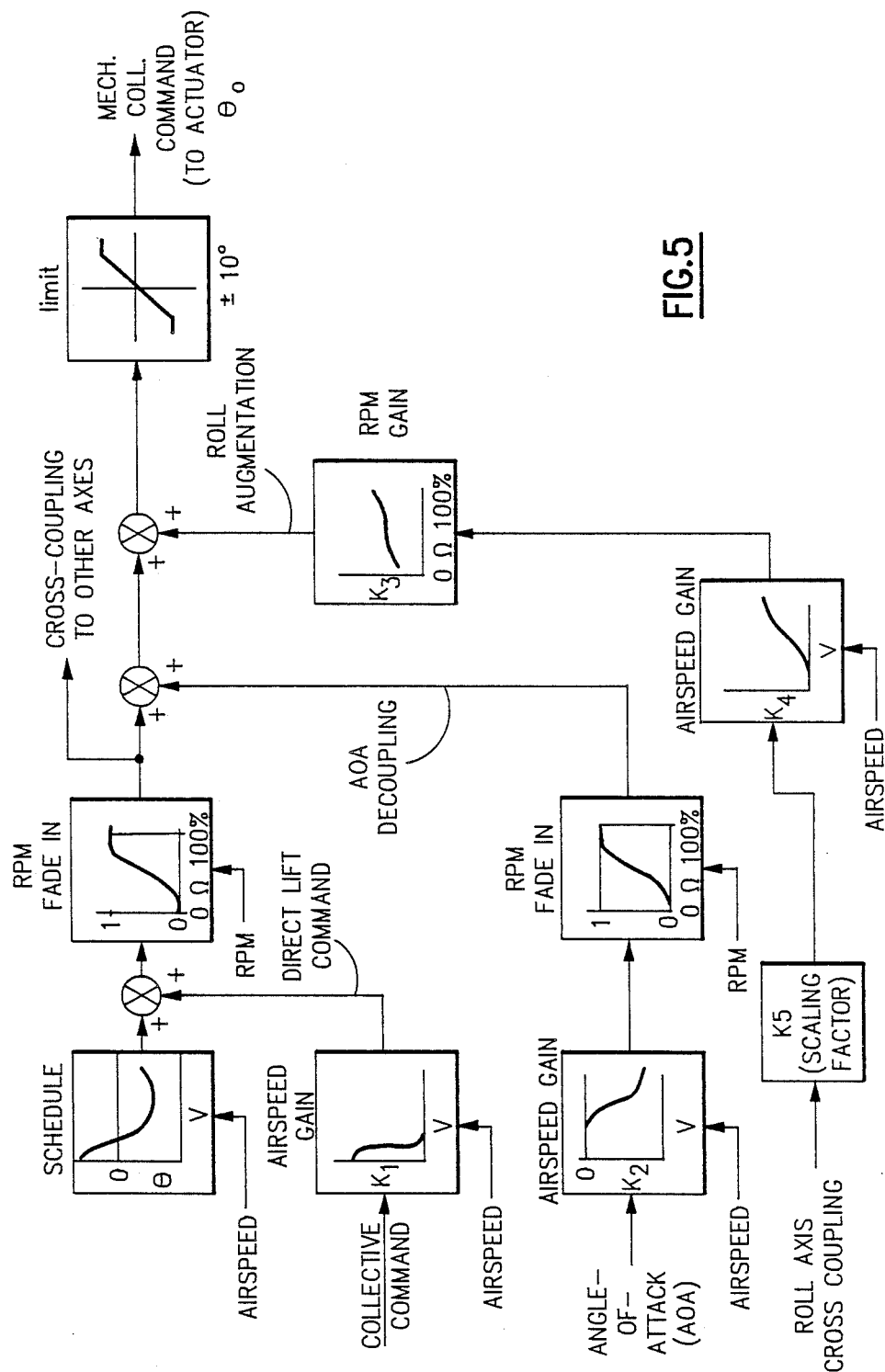

The exemplary embodiment of the mechanical collective control law of the present invention is presented schematically in FIG. 5, with the logic, flow and calculation steps shown in the figure. The primary collective pitch path is shown on top.

Collective pitch is scheduled with airspeed in RW mode. In hover, the pitch ("$\theta$") is set at, for example, six (6) to eight (8) degrees positive. This provides the required lift, while allowing the pneumatic collective pressure ratio to be maintained at a mid-value. This scheduling compensates for the increased lift that results from forward velocity ("V"); while, at the same time, allows the pneumatic collective to remain at its mid-point value.

By about, for example, eighty (80) knots velocity ("V"), the collective set point ("$\theta$") is down to zero degrees, and by, for example, one hundred and twenty (120) knots, it ("$\theta$") is at minus four (−4) to minus six (−6) degrees. At these airspeeds the mechanical collective pitch is now functioning to provide roll trim. Because Mach number effects reduce the lift on the advancing blades, the negative pitch ("$\theta$") is reduced slightly at even higher airspeeds, reaching, for example, minus two (−2) to minus three (−3) degrees at two hundred (200) knots.

Because collective pitch is normally zero in SR mode, the basic map is fed through an RPM fade-in. This is a gain that varies with rotor speed. It is zero for, for example, from zero (0%) to ten (10%) percent rotor speed (omega), then increases with rotor speed until the gain gets to one at, for example, ninety (90%) percent (omega), staying at that value to, for example, one hundred and ten (110%) percent (omega). The advantage of using an RPM scheduled gain is that conversion can take place over a broad range of airspeeds (140 to 200 knots), and yet the collective pitch will always be at a suitable value.

The collective command signal is used to command direct lift changes. As can be seen in the upper middle part of FIG. 5, this signal is fed through an airspeed, decreasing variable gain. In hover and low speed rotary wing flight, the collective command effectively is fed directly to the mechanical collective. This compensates for variations in the aircraft weight and allows for vertical maneuvering. As the airspeed increases, the gain ("$K_1$") is reduced, going to zero around, for example, eighty (80) knots in airspeed ("V"). This signal is summed with the basic map and therefor also is faded out in SR mode.

As will be seen more fully below in connection with FIG. 6, the pneumatic collective is faded in to provide direct lift control at higher speeds.

Compensation for the strong cross-coupling of the angle-of-attack to roll moment is accommodated by feeding the angle-of-attack ("AOA") through an airspeed varied gain. As can be seen in the lower middle part of FIG. 5, out to about, for example, one hundred (100) knots in velocity ("V"), no compensation ($K_2 = 0$) is required. At higher speeds, changes in the AOA result in collective pitch inputs, which tend to cancel the induced rolling moment. It should be noted that the gain ("$K_2$") is negative, i.e., positive AOA (nose-up) produces negative collective pitch, with the gain increasing with airspeed.

Since this aerodynamic cross-coupling occurs only in RW mode, the de-coupling signal is fed through an RPM fade-in before being summed with the mechanical collective. This performs the same function as the RPM fade-in in the primary control path, but a separate function is used to allow for a different shaping of the fade-in gain with rotor speed.

Since mechanical collective pitch in high speed RW, CV and SR modes is a strong rolling moment generator, it is appropriate to use it to augment the pneumatic roll control in these regimes. This is done by cross-feeding the roll axis command signal to collective pitch.

As can be seen in the lower, left hand part of FIG. 5, the roll axis cross coupling command signal is first scaled with an appropriate scaling factor ("$K_5$"), since it is typically in foot-lbs. and the collective pitch command is in degrees. Next, the scaled roll command signal is gained ("$K_4$") with airspeed ("V"). No input is allowed at low speeds ($K_4 = 0$), with the gain ("$K_4$") beginning to be non-zero around, for example, one hundred (100) knots velocity ("V"). Higher gain is used at higher airspeeds. Because the roll movement sensitivity is different in RW and SR modes, provision is also made for an RPM varying gain ("$K_3$"), with a higher value in RW mode (note difference in function curves) varying gain but not serving as a fader.

Figure 1:
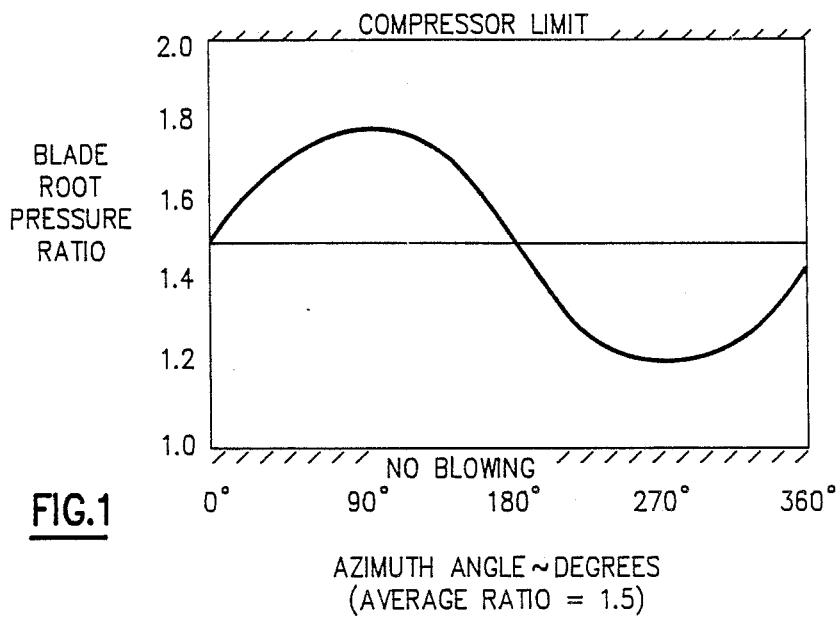
Figure 2:
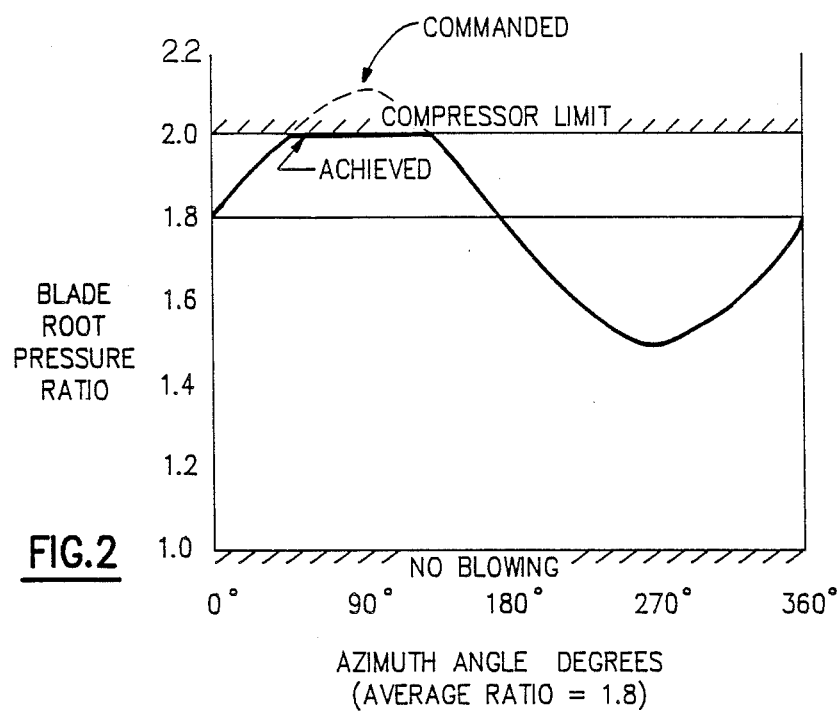
Figure 3:
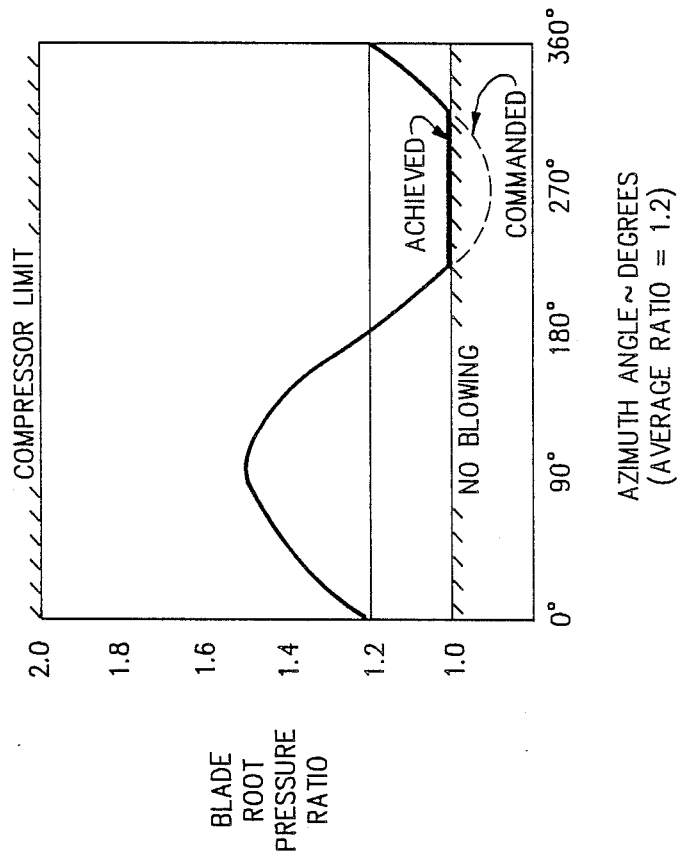
FIG. 3 is a graph of the blade root pressure ratio versus the azimuthal angle in degrees, with the collective pressure ratio reduced to one and two-tenth (1.2), producing clipping below one (1; "no blowing").
Figure 4:
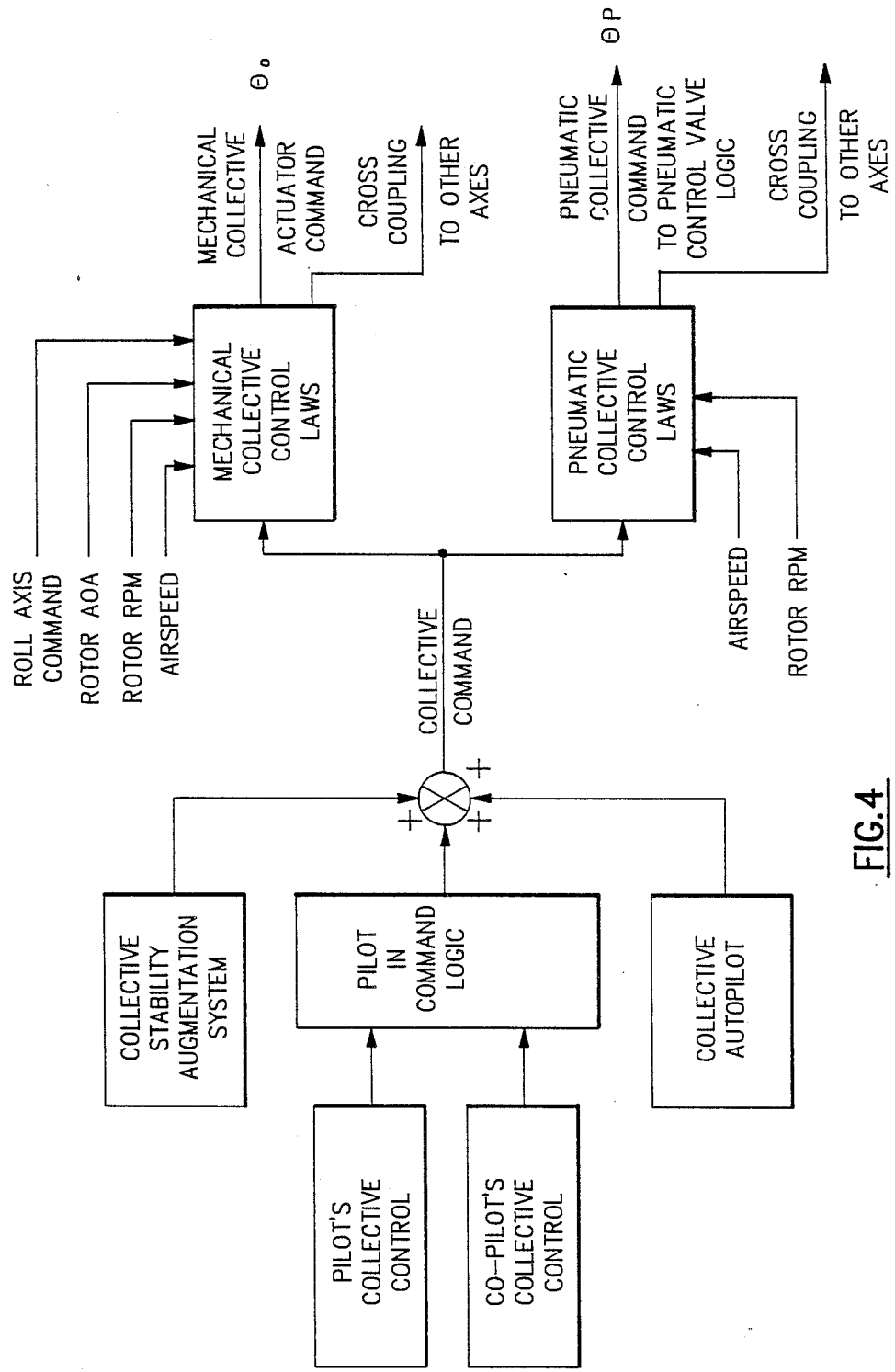
FIG. 4 is a simplified block diagram of the exemplary embodiment of the collective control system of the present invention.

The final collective pitch command signal is the sum of the above signals. As can be seen in the upper, right hand portion of FIG. 5, the summation signal is fed through an authority limit (typically ±10 degrees) and sent to the mechanical collective pitch actuator, as shown in the overall system block diagram of FIG. 4.

Pneumatic Collective Control Law

The exemplary embodiment of the pneumatic control law of the present invention is shown in FIG. 6. As can be seen, the primary path is a map, which commands the pneumatic collective as a function of rotor speed. In RW mode, the collective pressure ratio set point is around, for example, 1.55, decreasing to, for example, 1.4 in SR mode. During conversion, the reduced lift state is compensated for by an increase in collective blowing at around, for example, eighty (80) percent rotor speed (omega).

Direct lift control is achieved by adding in the collective command signal to the primary path pneumatic collective, as shown in FIG. 6. Since large changes in collective blowing are undesirable in RW mode, as can be seen in the lower left of FIG. 6, the collective command signal is first decreasingly gained as a function of RPM, with the RW gain being about, for example, forty (40%) percent of the SR one. In order to prevent collective blowing variation in the transition speed range, the collective command signal is also gained ("$K_6$") with respect to airspeed ("V"). Control is allowed starting at about, for example, sixty (60) knots and increasing with airspeed ("V") to about, for example, one hundred (100) knots. In this way, direct lift control is automatically transferred from mechanical collective pitch to pneumatic collective.

The final pneumatic collective signal is the sum of the signals discussed above. As can be seen in the upper right of FIG. 6, the pneumatic collective command is fed through a limit (e.g. limiting the values of the signal from 1.0 to 2.1) and then sent to the pneumatic value control logic, as shown in the overall system block diagram of FIG. 4.

Pitch and Roll Control Laws

Figure 8:
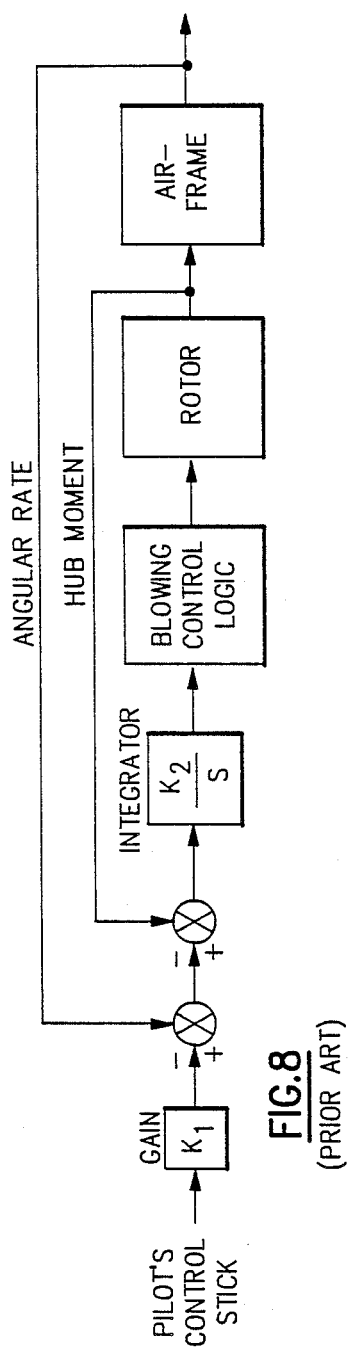
FIG. 8 is a block diagram schematically illustrating the basic prior art use of adding angular rate feedback to the hub moment feedback.

For the reasons detailed above, the prior art approach of hub moment feedback (HMF), shown in FIG. 8, is not an acceptable control system. It should be noted that the above prior art discussion applies to pitch and roll control and that it is true regardless of the flight mode-rotary wing, conversion or stopped rotor. The addition of a proportional path around the integrator can significantly improve the band width of the controller, while retaining all the intrinsic advantages of HMF. This is discussed in detail below.

Pitch Axis Control Law

Figure 9:
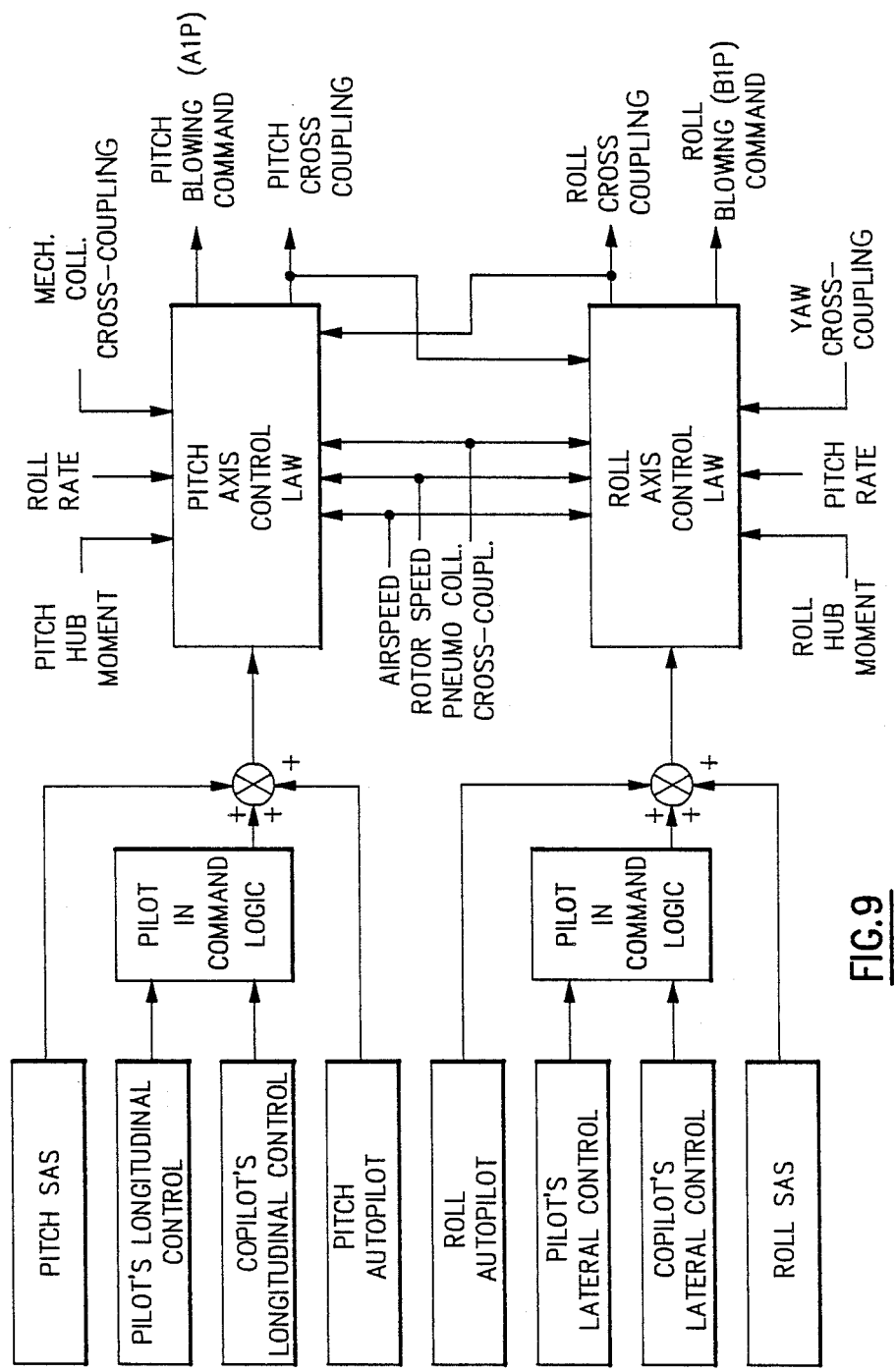
Figure 10:
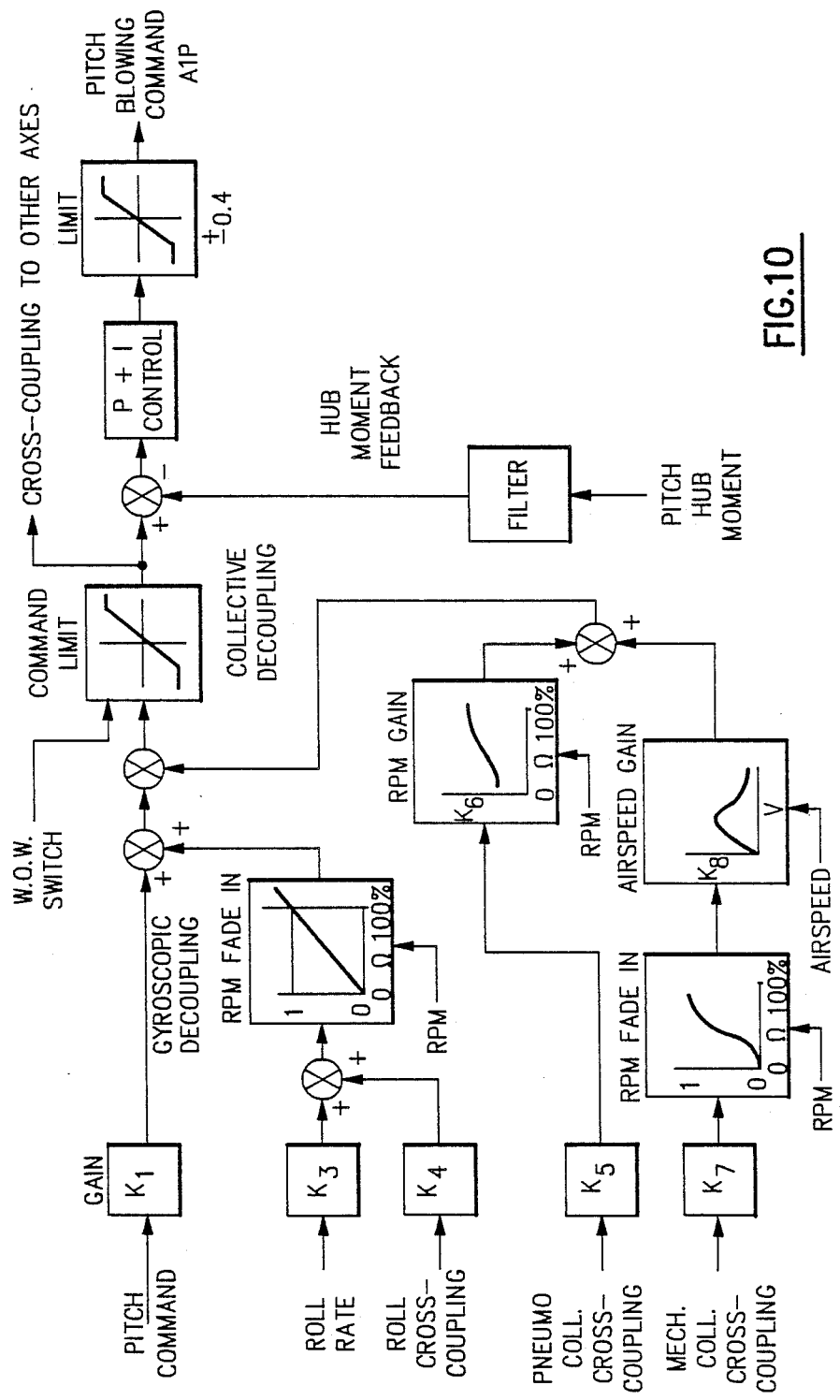
FIG. 10 is a block diagram schematically illustrating the exemplary embodiment of the pitch axis control law of the system of the present invention.

The pitch axis control law for the overall pitch and roll axes system of FIG. 9 is shown in FIG. 10. The pitch command signal is scaled and fed through a limiter for comparison with the pitch hub moment. The error signal drives a proportional plus integral controller (P+I), which outputs the pitch blowing command after limiting.

Figure 11:
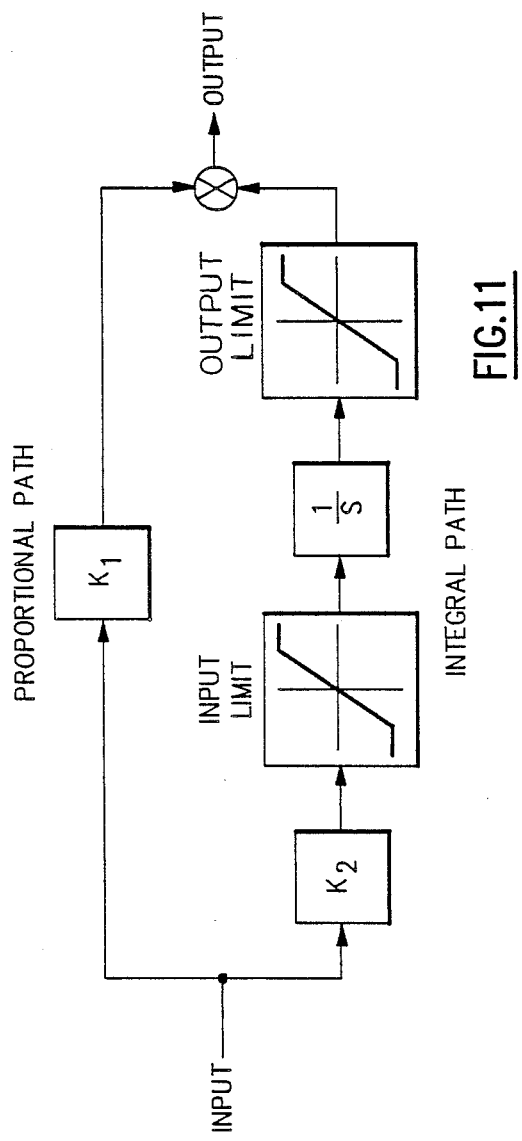
FIG. 11 is a block diagram schematically illustrating a proportional plus integral controller.

The P+I controller itself is shown schematically in FIG. 11. The error signal is fed through two paths. One is a simple proportional path with a gain. The second path is an integral path, where the error signal is integrated. A separate gain is provided for this path.

As can be seen in the figure, the integrator has both an input limit and an output limit. The input limit prevents large signals from driving the integrator too fast. The output limit sets the saturation point and prevents large error signals from driving the integrator to unnecessary high outputs.

The use of a P+I controller in the HMF loop has significant advantages. The integrator part functions in the normal way, holding the required blowing command as the error signal goes to zero. The proportional path significantly increases bandwidth, since a portion of the error signal is fed straight to the blowing command and there is no waiting for the integrator. This significantly improves the rotor response to stick inputs.

Referring back to FIG. 10, the next feature of the pitch control law is gyroscopic de-coupling. As can be seen in the upper middle part of the figure, this preferably is achieved by feeding the roll rate to the pitch command. In this way, the pitching moments generated by roll rate are compensated for.

Use of this feedback has shown, however, that it has low bandwidth. This problem is solved by also feeding the roll command signal to pitch through a low gain. This coupling anticipates the roll rate that will occur and significantly reduces the transient cross-coupling effects.

Since both of these signals are for gyroscopic decoupling, as shown in the figure, they are fed through a linear RPM fade-in. There is no compensation when the rotor is stopped, and the amount of feedback is linearly proportional to rotor speed.

Another cross-coupling that is compensated for is collective to pitch. Changes in collective blowing will produce changes in the rotor pitching moment. The pneumatic collective cross-coupling command is fed through an RPM gain schedule, since the collective blowing to pitch coupling is a function of the flight mode.

A similar situation exists with mechanical collective pitch to aircraft pitch moment coupling. In this case, the coupling only exists in rotary wing mode and disappears as the rotor stops rotating. In addition, this coupling is sensitive to airspeed. As can be seen in the lower left of FIG. 10, the mechanical collective feedback is therefore fed through both an RPM fade-in and a velocity gain schedule.

The pitch hub moment used for HMF contains large vibratory components in RW mode, typically, with 1/rev. and 4/rev. components, but 2/rev. and 3/rev. components may also be present. These vibratory components must be filtered out, typically with combinations of low pass and notch filters. Since the rotor speed can vary, the notch filters must track rotor speed. All this filtering adds considerable phase lag to the basic steady moment signal. This would otherwise have resulted in poor transient response, but the proportional path in the P+I controller compensates for this, as discussed above.

Very large cyclic blowing commands only result in saturation of the blowing. For this reason, the final pitch blowing command is limited to, for example, a ±0.4 pressure ratio, as can be seen in the upper right of FIG. 10. Because the moments created by the rotor on the airframe can be very large, the command signal to the HMF control is limited. In addition, this limit is further reduced when the aircraft is on the ground. In the air, large hub moments produce angular rates—this aircraft motion in turn relieves the hub moment. On the ground, no such inertial relief is available, so the commands are further limited using a weight-on-wheels (W.O.W.) switch.

Roll Axis Control Law

Figure 12:
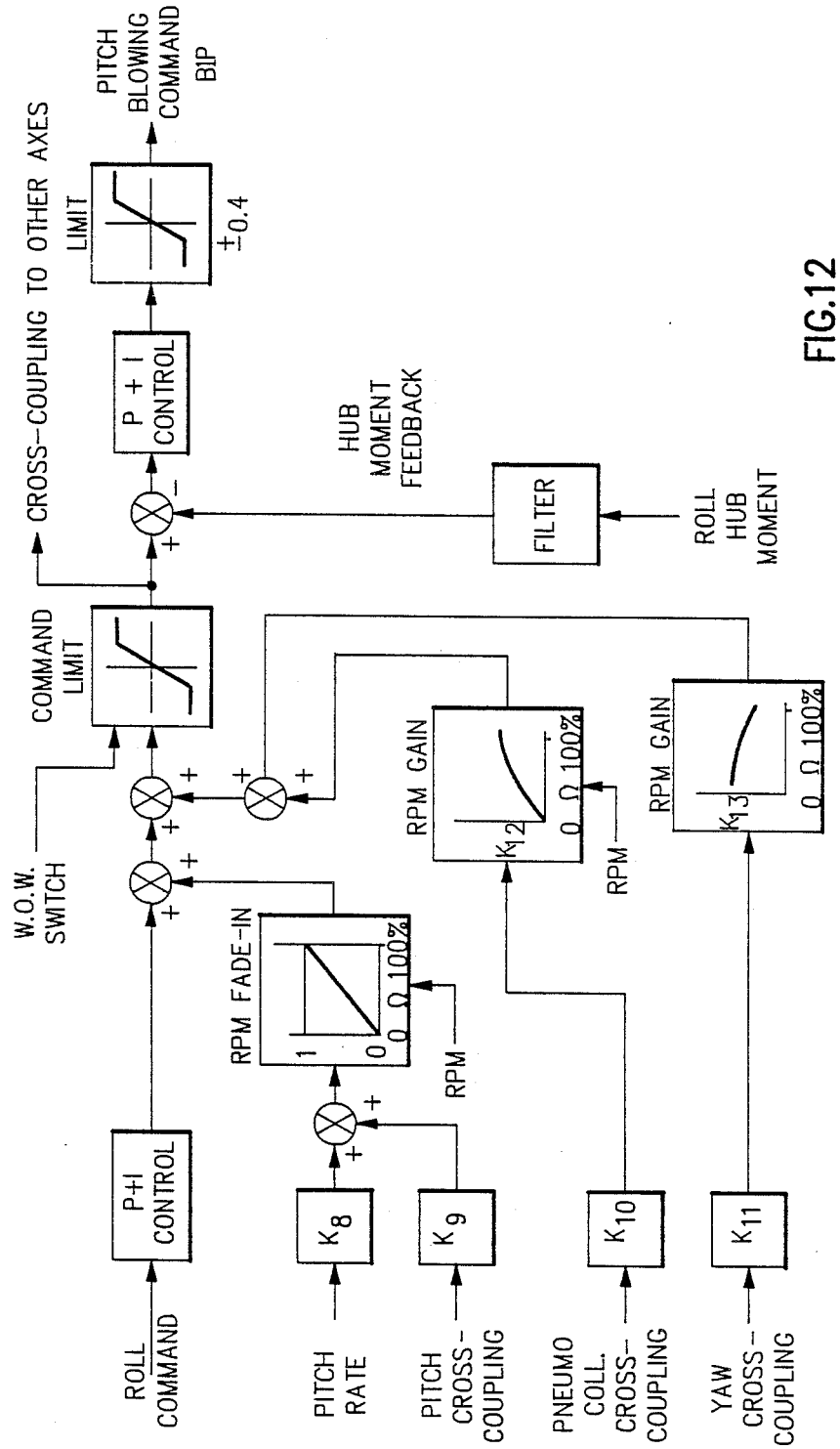
FIG. 12 is a block diagram schematically illustrating the exemplary embodiment of the roll axis control law of the system of the present invention.
Figure 13:
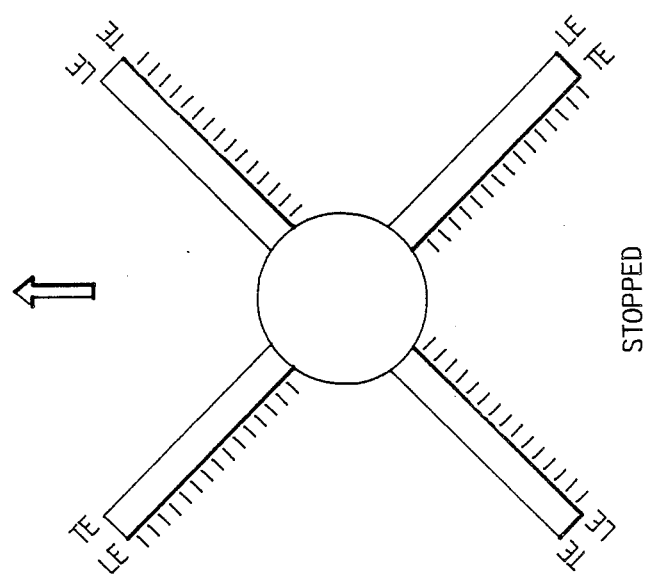
FIG. 13 is a generalized, simplified illustration showing the leading edge and trailing edge blowing from the edges of the rotor, when the rotor is in its rotating and its stopped dispositions.
Figure 13:
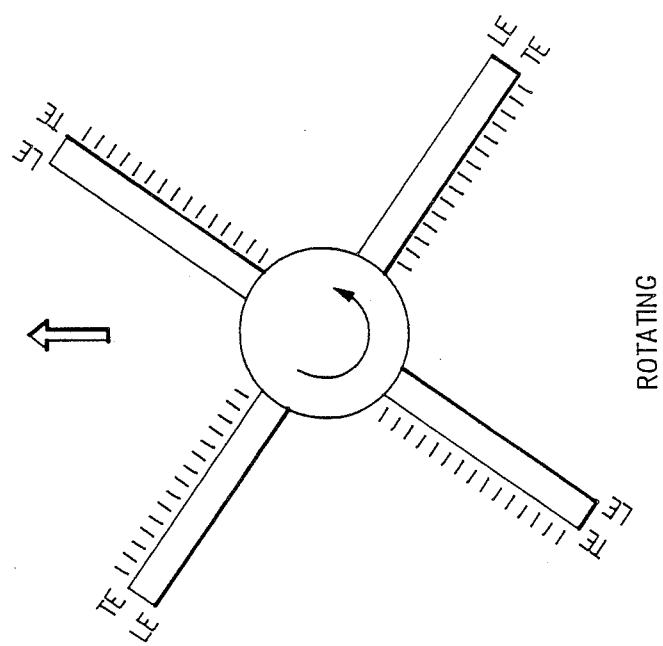
Figure 14:
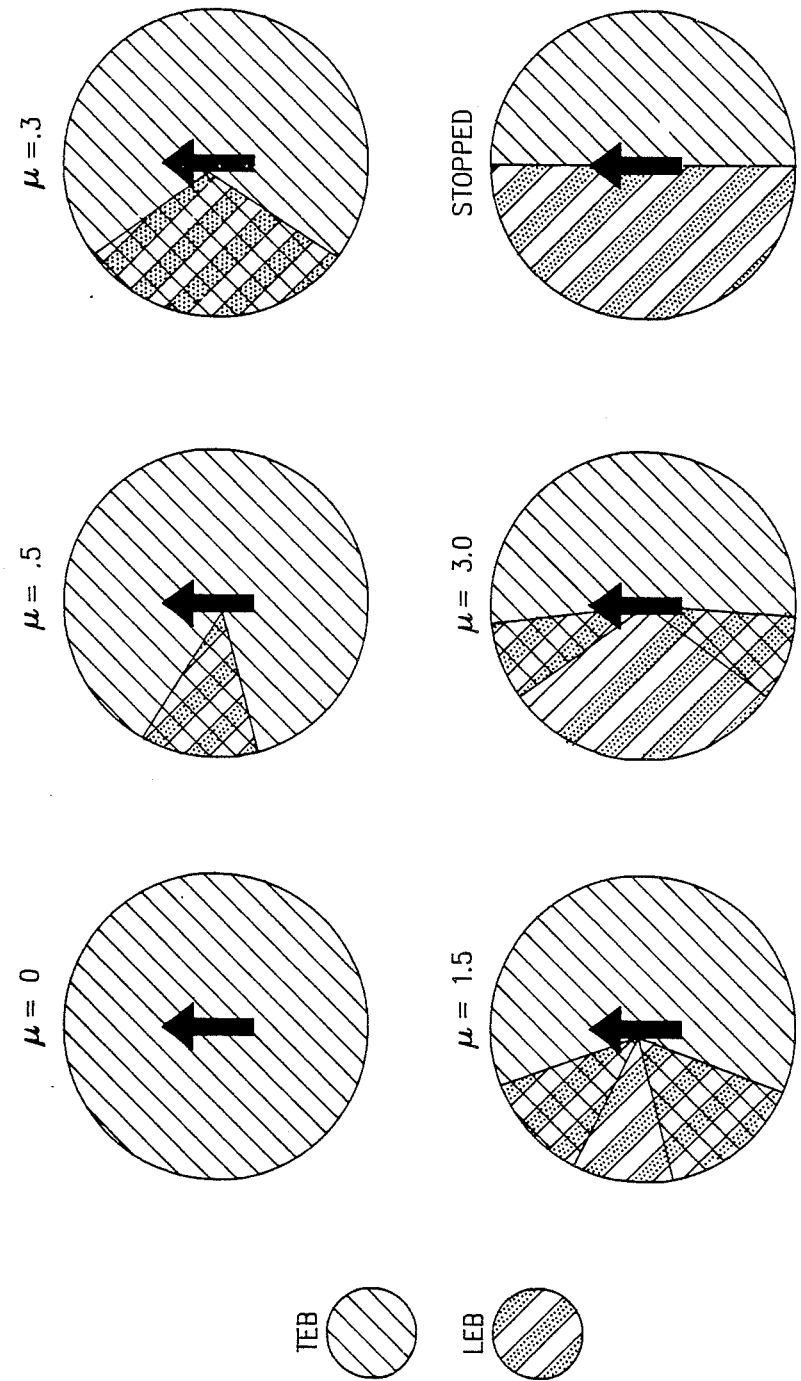
FIG. 14 is a diagrammatic view showing the variation in the trailing and leading edge blowing with the changes in the rotor advance ratios.

The current best mode for the roll axis control law of the present invention is shown in FIG. 12. It is essentially the same architecture as the pitch axis and preferably has all of the same major features—primary control through HMF using a P+I controller, explicit gyroscopic de-coupling using pitch rate and pitch command feedback, and provision for cross-coupling from the other axes.

In the case of the roll axis, de-coupling of the pneumatic collective is provided by an RPM sensitive gain as in pitch, but no de-coupling of the mechanical collective is required. In fact, mechanical collective is used to generate roll moment, as discussed in the section above on the collective axis.

Another cross-coupling preferably provided is yaw to roll. This is done to provide the same equivalent dihedral in all flight modes and also to provide for improved turn coordination. Other comments made regarding the pitch axis also apply to the roll axis in terms of output limiting, changes in command limits with W.O.W. and filtering of hub moment.

Pneumatic Valving Control Laws

Figure 15:
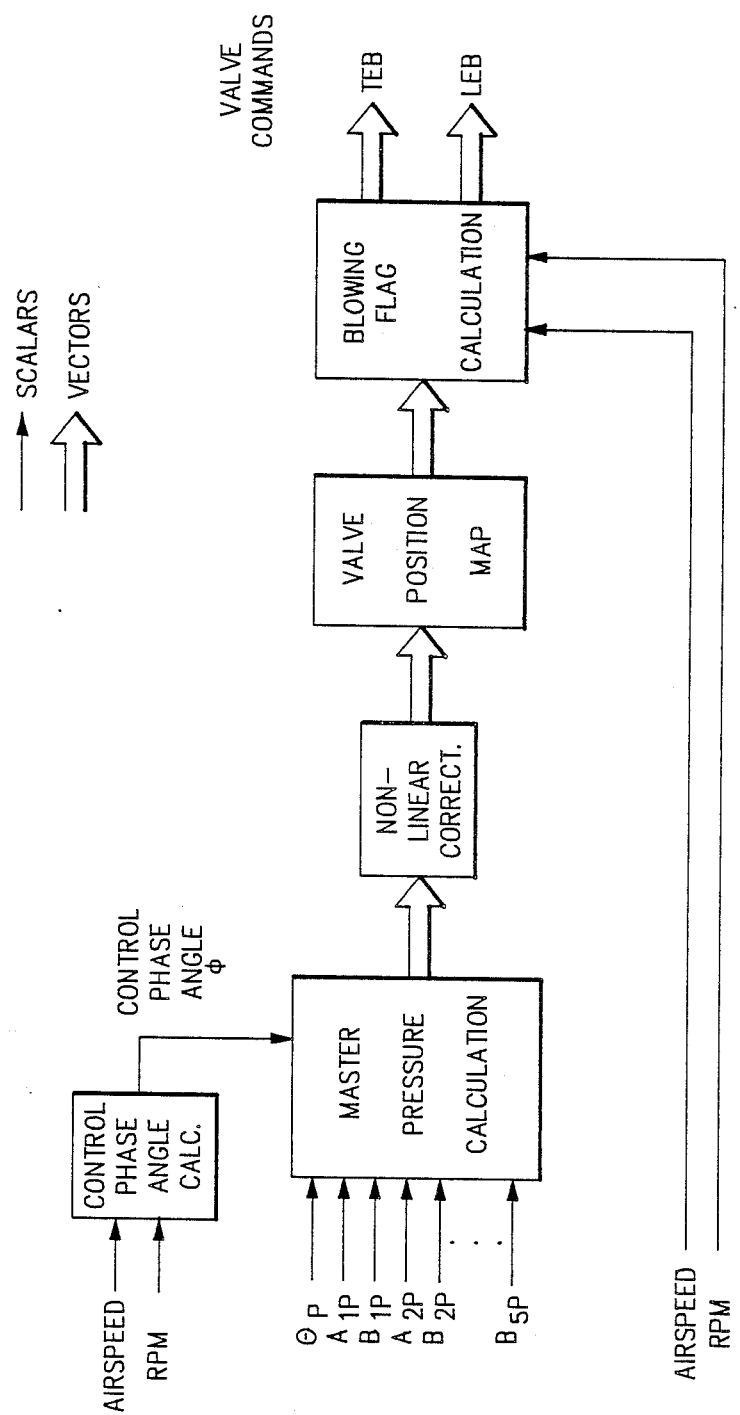
FIG. 15 is a block diagram giving an overview of the exemplary embodiment of the pneumatic valve control laws of the system of the present invention.

An overview of the currently preferred, exemplary or current best mode of the basic valve control laws of the present invention is generally shown in overview in FIG. 15. The control phase angle is calculated as a function of airspeed and rotor speed. The phase angle is used along with the collective, cyclic and higher harmonic commands to calculate a master pressure wave.

A non-linear correction is applied to compensate for the non-linear nature of circulation control lift, and the resulting commands are sent to the valve position map. This calculates the valve position required to achieve the desired blade root pressure at that azimuth. These valve commands are then sent to the blowing azimuth logic. This block calculates the azimuths over which LEB and TEB should occur. The valve positions are multiplied by on-off flags to create the TEB and LEB commands.

A. Control Phase Angle

Figure 16:
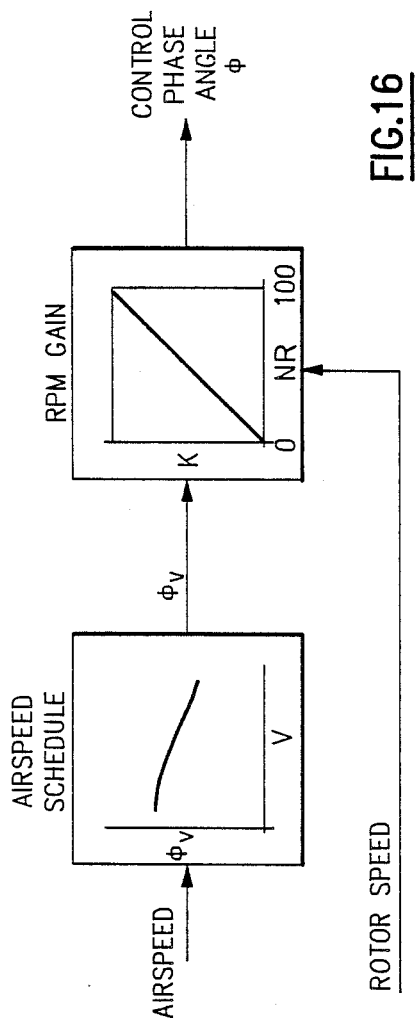
FIG. 16 is a block diagram showing the control phase angle calculation for the block diagram of FIG. 15.

Cyclic control phase angle can be varied with rotor RPM and airspeed, as shown in FIG. 16. A map of the phase angle versus the airspeed is used, which is then fed through an RPM scheduled gain.

B. Blowing Azimuth Logic

Figure 17A:
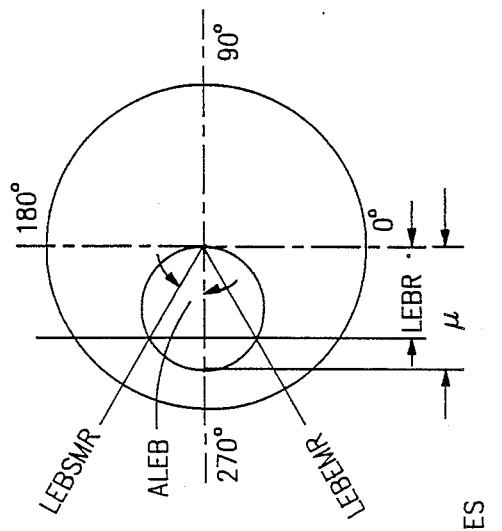
FIGS. 17A and 17B are schematic diagrams showing the calculations of the blowing azimuths for the leading edges and trailing edges, respectively.
Figure 17B:
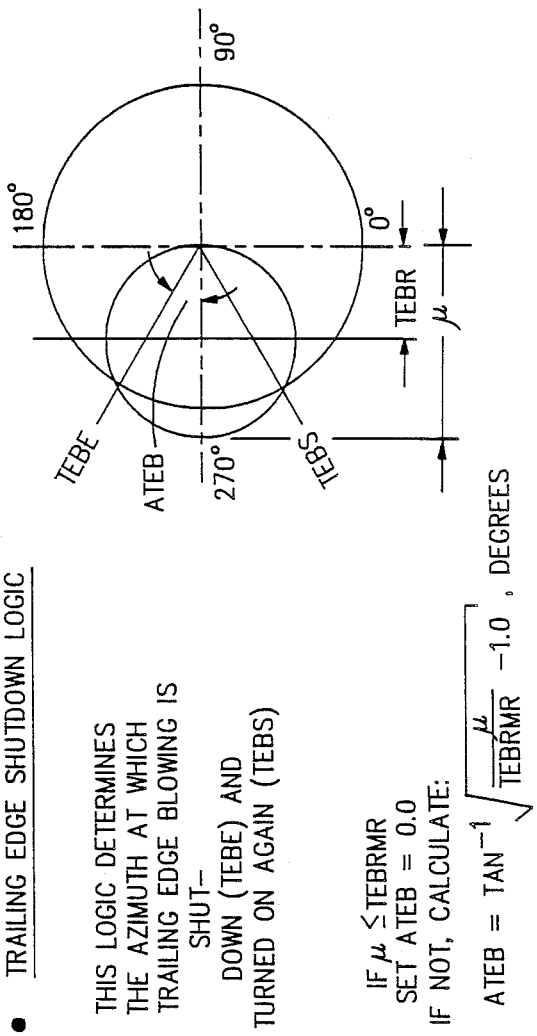

The blowing azimuth logic sets flags or switches, which determine if a valve is to be set to the commanded valve for that azimuth location (flag=1) or is to remain closed (flag=0). The method for calculating the valve flag state as a function of advance ratio is shown in FIGS. 17A and 17B, the former illustrating the leading edge blowing logic and the later the trailing edge shut down logic.

As illustrated the reverse flow circle for a given advance ratio is drawn. A line is drawn at a radial location equal to the advance ratio at which the blowing is to be turned on (LEB) or turned off (TEB). The intersection of this line and the circle defines the azimuth angle for that advance ratio. The turn-on and turn-off azimuths can then be defined for all advance ratios of interest.

Analytical studies have shown that LEB should be started (i.e. dual blowing introduced) at an advance ratio of one-half (0.5), and TEB should be turned off (i.e. have LEB only) at an advance ratio of one (1.0). It should be noted that TEB is always employed on the advancing side of the disk, and LEB is always turned off on that side.

With the turn-on, turn-off advance ratios defined and with the valve azimuth locations fixed, the advance ratios for individual valve turn-on and turn-off can be precalculated. The blowing azimuth logic then simply includes a table for the leading edge valves and a table for the trailing edge valves, which is accessed as a function of advance ratio and sets of flags accordingly.

Figure 18:
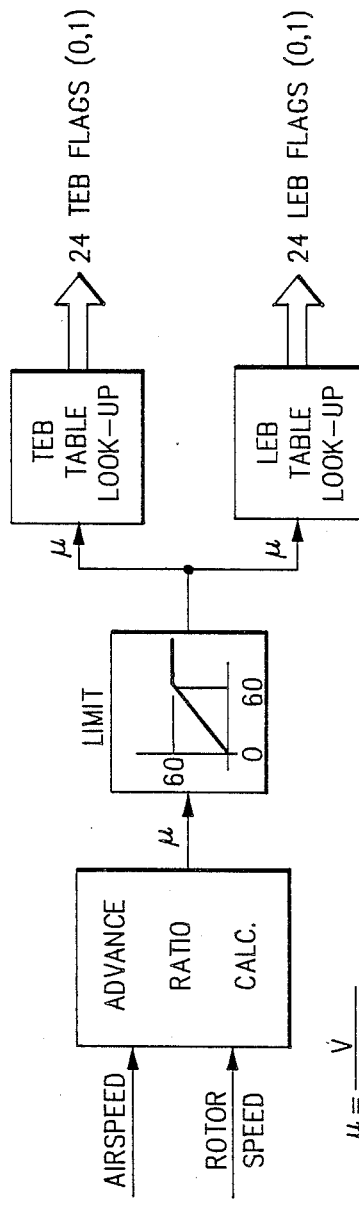
FIG. 18 is a block diagram showing the blowing flag calculation for the block diagram of FIG. 15.

The blowing flag calculation is graphically shown in FIG. 18, and sample tables for a twenty-four (24) valve configuration are shown in FIGS. 19A and 19B. In this case, the valve sets were co-located, i.e., they have the same azimuthal location.

C. Valve Position Calculation

Figure 20:
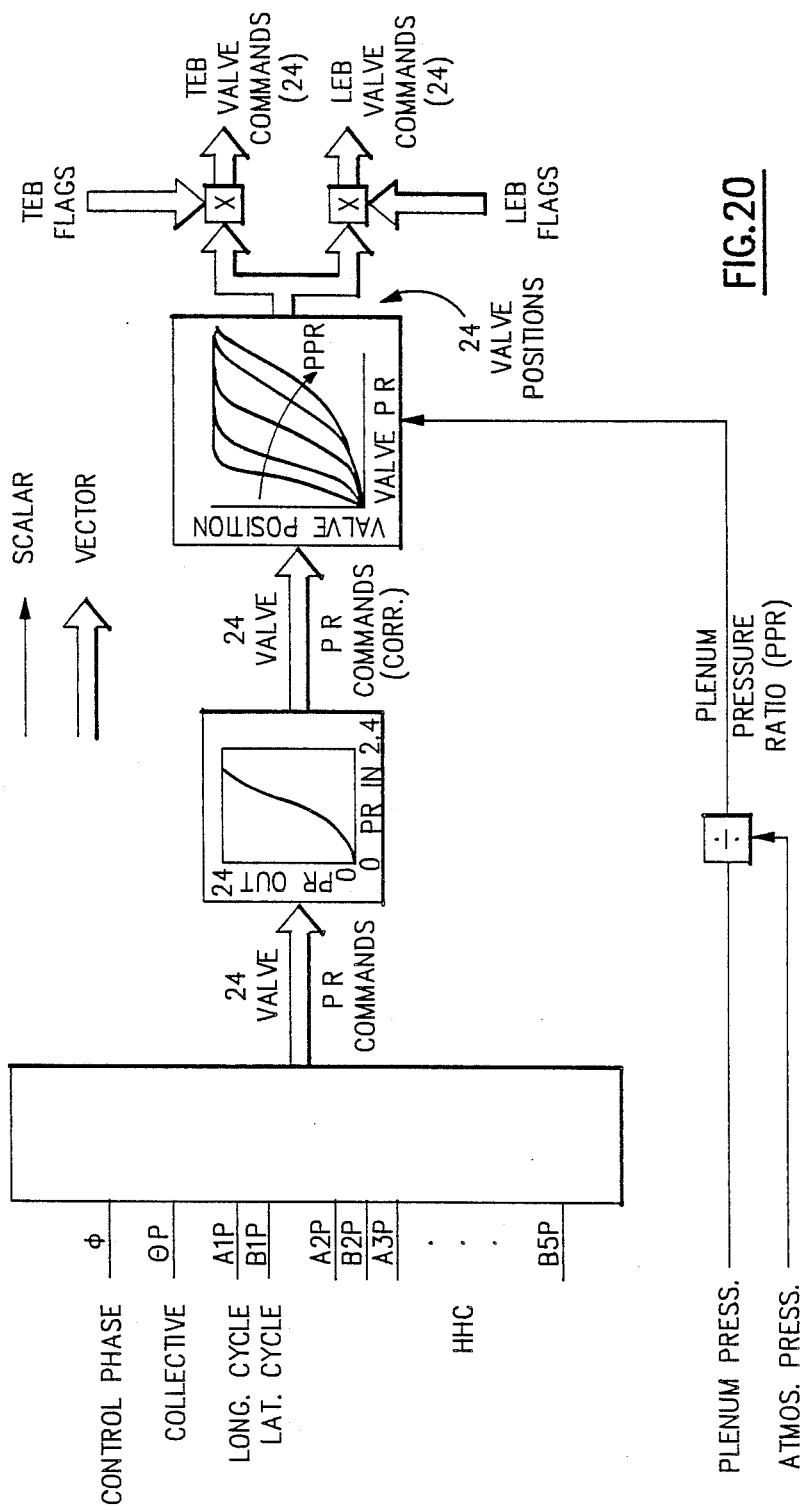
FIG. 20 is a schematic, block diagram showing the valve position calculations for the block diagram of FIG. 15.

The valve position calculation is graphically shown in FIG. 20. The calculation proceeds as described below. It should be noted that this logic assumes that the trailing edge and the leading edge valves have the same azimuthal locations, and that there are twenty-four (24) equally spaced valves for each set. However, the logic could be easily modified to account for differing azimuthal locations or numbers of valves.

The first step is to calculate the desired pressure ratio at each valve azimuth as the Fourier series or sum of the collective, cyclic and higher harmonic blowing commands; that is:

$$PR(\Psi_i) = \theta P + A_{1p}\cos(\Psi_i + \phi) + B_{1p}\sin(\Psi_i + \phi) + A_{2p}\cos(2\Psi_i) + B_{2p}\sin(2\Psi_i) + A_{3p}\cos(3\Psi_i) + B_{3p}\sin(3\Psi_i) + A_{4p}\cos(4\Psi_i) + B_{4p}\sin(4\Psi_i) + A_{5p}\cos(5\Psi_i) + B_{5p}\sin(5\Psi_i)$$

where:
 $\Psi_i$ = azimuth angle of $i_{th}$ valve,
 $\theta P$ = collective blowing command,
 $A_{1p}$ = pitch blowing command,
 $B_{1p}$ = roll blowing command,
 $A_{2p}, \ldots, B_{5p}$ = HHC blowing commands, and
 $\phi$ = control phase angle.

The control phase angle, $\phi$, is only applied to the pitch and roll blowing commands ($A_{1p}$, $B_{1p}$) and not the higher harmonic commands ($A_{2p}$ to $B_{5p}$).

Because of the intrinsic non-linearity of circulation control lift with pressure ratio, the twenty-four (24) commanded pressure ratios are corrected by using a map look-up. This basically decreases the low pressure commands and increases the high pressure ones. The exact shaping of this correction map depends on the nature of the slot used for blowing on the blade.

The third step is to calculate the valve position required to achieve the commanded root pressure. This is done via a bi-variant map look-up, showing the position required as a function of the plenum pressure ratio and the commanded pressure ratio.

The use of a bi-variant map has significant advantages. First of all, even valves with very non-linear pressure drops versus their position characteristics (e.g. butterfly valves) can be automatically compensated for.

Secondly, variations in the plenum pressure are also automatically compensated for; although, of course, the plenum pressure must be high enough to provide the maximum demanded pressure with the losses of a fully open valve. Anytime insufficient plenum pressure is available, this logic will provide an open valve.

The result is twenty-four (24) valve commands, but there are a total of forty-eight (48) valves (24 LEB, 24 TEB). The flags calculated by the blowing azimuth logic preferably are used to then determine the commands for each set of valves.

D. Other Features

There are several other, more subtle features of the valve control laws described above.

First—the same algorithm preferably is used continuously, regardless of the flight mode or flight condition. There preferably is no switching of control laws with airspeed or rotor speed. The logic is thus simpler and faster to execute.

Second—all valves preferably are commanded at all times. A valve malfunction can be detected, even if the valve is not in use at that particular time.

Third—when dual edge blowing (DEB) is employed, preferably both slots receive the same root pressure command.

With respect to the hardware for implementing the control law system of the present invention, reference is had to the co-pending application entitled "X-Wing Fly-By-Wire Vehicle Management System" (S-4161) by William C. Fischer, referred to above. In particular it is noted that the major hardware elements of the overall system include the flight control computer (FCC), the actuator control module (ACM), and the pneumatic control valve (PCV) actuator.

The FCC can be, for example, a Z-8002 microprocessor-based computer with a very extensive input/output signal conditioning complement mandated by the multiplicity of system sensors and actuators. Two major systems challenges, which have been successfully addressed, are the computational demands on the flight control computers and the magnitude of the software creation tasks. Throughput in excess of two and one half million instructions per second ($2.5 \times 10^6$ MIPS) per channel can be achieved by, for example, a lattice matrix architecture, which provides four microprocessors per channel in a parallel/co-processor configuration. Efficiencies are achieved through creation of a task driven executive and extensive use of assembly language programming. Software can be treated by a structured development methodology characterized by the classical checks and culminating in a jointly structured/vendor conducted verification.

The complete computer chip set can be comprised of, for example, four boxes all containing identical primary control and back-up control software (BUCS) for flight critical functions. In addition, two of the boxes preferably contain the automatic flight control system (AFCS); and the other two boxes preferably contain an active higher harmonic control (HHC).

The actuator control module (ACM) can be, for example, the standard quadruple electrical/dual hydraulic actuator interface between the FCC and the hydraulic ram, which would be sized for the load of the specific application. It exhibits hydrologic, hydraulic shutdown interlock, and initiated built-in test (IBIT) features.

The pneumatic control valve (PCV) actuator preferably is a dual electrical/dual hydraulic powered actuator controlled by, for example, either of two computers. Two actuators preferably are housed in an assembly, one for leading edge valve control and the other for trailing edge valve control via concentric shafts.

Although this invention has been shown and described with respect to detailed, exemplary embodiment(s) thereof, it should be understood by those skilled in the art that various changes in form, detail, methodology and/or approach may be made without departing from the spirit and scope of this invention.

Having thus described at least one exemplary embodiment of the invention, that which is new and desired to be secured by Letters Patent is claimed below.

We claim:

1. A method of controlling an X-Wing type aircraft made up of at least one set of control laws, which aircraft has a rotary wing ("RW") mode and a stopped rotor ("SR") mode with a conversion ("CV") mode as the rotor changes between said RW and SR modes during flight of the aircraft, with the rotor having a collective pressure ratio set point and a reduced lift state and with the aircraft having a controlled aircraft response during flight under a control law system, comprising the following steps:
   (a) utilizing a pneumatic collective control law commanding pneumatic collective as a function of rotor speed, and, in said RW mode, making the collective pressure ratio set point a positive value, decreasing but remaining positive in said SR mode, and, during said rotor mode conversion ("CV"), compensating for the reduced lift state by an increase in collective blowing;
   (b) utilizing a set of pitch and roll axes control laws to essentially producing said aircraft response regardless of flight mode or flight condition by compensating for undesirable cross-couplings without requiring pilot action, as said flight mode or said condition is changed; implementing a hub moment feedback scheme utilizing a proportional and integral ("P+I") controller, significantly improving its bandwidth; and providing limits to the rotor hub movements protecting the aircraft structure from inadvertent damage; and
   (c) utilizing a set of pneumatic valving control laws for controlling the position of the valves for the blowing out of air at the blade edges of the rotor and providing the pressure required at each valve azimuth location, with automated switching for leading edge blowing ("LEB"), trailing edge blowing ("TEB") and dual edge blowing ("DEB") using a table look-up procedure.

2. The method of claim 1, wherein in conjunction with step "a" there is included the following steps:
   utilizing a mechanical collective control law giving the pilot single-lever direct lift control, while making available at least substantial cyclic blowing control power in said conversion ("CV") from one mode to another; providing angle-of-attack de-coupling in rotary wing flight, and using mechanical collective to augment pneumatic roll control; and providing automatic gain variations with airspeed and rotor speed, resulting in a unitary set of control laws making up the control law system working in the rotary wing ("RW"), conversion ("CV") and stopped rotor ("SR") modes of the aircraft.

3. The method of claim 2, wherein there is included the following step:

scheduling collective pitch with airspeed in the rotary wing ("RW") mode, while allowing the pneumatic collective pressure ratio to be maintained at a mid-value.

4. The method of claim 2, wherein there is included the following step:

making the maximum cyclic blowing control authority available by maintaining the collective pressure ratio at about its mid-value during the conversion ("CV") mode.

5. The method of claim 2, wherein there is included the following step:

providing a coupling between angle-of-attack (AOA) and mechanical collective pitch, providing automatic compensation to cancel the rolling moments created by angle-of-attack changes in high speed RW flight.

6. The method of claim 2, wherein there is included the following step:

automatically setting the pneumatic collective to its optimal value in said RW, CV and SR flight modes.

7. The method of claim 2, wherein there is included the following step;

cross-coupling the mechanical collective to lateral stick, making roll control augmentation available in said RW, CV and SR flight modes.

8. The method of claim 2, wherein there is included a basic map and wherein there is included the following step:

feeding the basic map through an RPM fade-in that provides a gain that varies with said rotor speed.

9. The method of claim 8, wherein the provided gain is an RPM scheduled gain, and wherein there is included the following steps:

providing a gain of zero from about zero (0%) to about ten (10%) percent of said rotor speed, then increasing the gain with said rotor speed until the gain gets to about one at about ninety (90%) percent and maintaining the gain at about that value to about one hundred and ten (110%) percent, using the RPM scheduled gain to allow conversion to take place over a broad range of aircraft airspeeds from about one hundred and forty (140) to about two hundred (200) knots, while maintaining the collective pitch at a value that maintains flight of the aircraft.

10. The method of claim 2, wherein there is included the following steps:

using the collective command signal to command direct lift changes and feeding the signal through an airspeed variable gain, and, in hover and low speed rotary wing flight, feeding the collective command signal directly to the mechanical collective compensating for variations in the aircraft weight and allowing for vertical maneuvering, and, as said airspeed increases, reducing the gain, maneuvering to about zero at about eighty (80) knots.

11. The method of claim 10, wherein there is included the following step:

fading in the pneumatic collective, providing direct lift control at higher speeds.

12. The method of claim 11, wherein there is included the following steps:

summing a pneumatic collective signal with a basic map and also reducing said pneumatic collective signal in said SR mode.

13. The method of claim 2, wherein there is included the following step:

compensating for the strong cross-coupling of the angle-of-attack to roll moment by feeding an angle-of-attack ("AOA") signal through an airspeed decreasing varied gain before summing said AOA signal with a mechanical collective signal.

14. The method of claim 13, wherein there is included the following steps:

providing about a zero AOA signal out to about one hundred (100) knots, and, at speeds higher than about one hundred (100) knots, providing an increasingly negative AOA signal, with changes in the AOA resulting in collective pitch inputs tending to cancel any induced rolling moment.

15. The method of claim 13, wherein there is included the following steps:

feeding the AOA de-coupling signal through an RPM fade-in before summing said AOA de-coupling signal up with the mechanical collective signal.

16. The method of claim 2, wherein there is included the following step:

using the mechanical collective pitch in high speed RW, CV and SR modes to augment said pneumatic roll control.

17. The method of claim 16, wherein there is included the following step:

cross-feeding a roll axis command signal to collective pitch signal.

18. The method of claim 17, wherein the control law system includes a roll axis cross coupling command signal, and wherein there is included the following steps:

scaling said roll axis cross coupling command signal; and feeding the scaled roll command signal through an airspeed gain with the gain being about zero at relatively low airspeeds below about one hundred (100) knots velocity and becoming an increasing, positive value at about one hundred (100) knots velocity.

19. The method of claim 18, wherein there is included the following further step:

feeding the airspeed gained and scaled roll command signal through a RPM varying gain.

20. The method of claim 1, wherein in step "a" there is included the following step:

increasing the collective blowing at about eighty (80) percent rotor speed.

21. The method of claim 1, wherein there is included a collective command signal and wherein in step "a" there is included the following step:

adding the collective command signal to the commanded pneumatic collective to produce a pneumatic collective signal, achieving direct lift control.

22. The method of claim 21, wherein there is included the following preliminary step:

decreasing the gain of the collective command signal as a function of RPM.

23. The method of claim 22, wherein there is included the following step:

setting the RW mode gain at about forty (40%) percent of the SR mode gain.

24. The method of claim 22, wherein there is included the following supplemented steps:

increasingly gaining the collective command signal as a function of said airspeed, preventing collective blowing variation in the conversion ("CV") speed range.

25. The method of claim 24, wherein there is included the following steps:
allowing direct lift command control signal to be increased at about sixty (60) knots and further increasing it with said airspeed to about one hundred (100) knots, transferring direct lift control from mechanical collective pitch to said pneumatic collective.

26. The method of claim 1, wherein there is further included a pneumatic value control logic circuit and wherein in step "a" there is included the following steps:
limiting the pneumatic collective command signal to a maximum value and then sending the limited pneumatic command signal to the pneumatic value control logic circuit.

27. The method of claim 26, wherein there is included the following step:
limiting the values of the pneumatic collective signal from about 1.0 to about 2.1.

28. The method of claim 1, wherein in step "a" there is included the following steps:
in said RW mode, setting the collective pressure ratio set point at about 1.55, decreasing to about 1.4 in said SR mode.

29. The method of claim 1, wherein in step "b" there is included the following step:
providing the pilot with a rate command control system in pitch and roll which produces said aircraft response to a given stick input regardless of said flight mode or said flight condition.

30. The method of claim 1, wherein the rotor of the X-wing aircraft can experience gyroscopic cross-couplings and wherein in step "b" there is included the following step:
automatically compensating for said gyroscopic cross-couplings.

31. The method of claim 1, wherein there is a blade root pressure on the blades of the rotor and wherein in step "c" there is included the following step:
linearizing any non-linearities of said blade root pressure to valve position due to the valve characteristics of circulation control lift by using map lookups.

32. The method of claim 1, wherein in step "c" there is included the following step:
providing azimuth variations in blade root pressure in accordance with collective, cyclic and higher harmonic blowing commands.

33. The method of claim 1, wherein in step "c" there is included the following step:
automatically scheduling said TEB, DEB and LEB on the retreating side as a function of advance ratio, which is the ratio of the aircraft's flight velocity divided by the rotor blade tip speed.

34. The method of claim 1, wherein in step "c" there is included the following step:
automatically compensating for the non-linear relationship between valve position and root pressure.

35. The method of claim 1, wherein in step "c" there is included the following step:
automatically compensating for the change in cyclic control phase angle required as a function of rotor rotational speed and said airspeed.

36. The method of claim 1, wherein in step "c" there is included the following step:
providing for a non-linear correction to the blowing to account for the non-linear nature of circulation control lift.

37. The method of claim 1, wherein in step "c" there is included the following step:
providing continuous commands to all said valves for said LEB and said TEB, allowing immediate detection of any malfunctions in the valves.

38. The method of claim 1, wherein there is further included the following step:
using a unified set of control laws for said RW, CV and SR modes and varying some functions of the control law based on the rotor speed and airspeed to compensate for the modes.

39. A control system for an X-Wing aircraft made up of at least one set of control laws, which aircraft has a rotary wing ("RW") mode and a stopped rotor ("SR") mode with a conversion ("CV") mode as the rotor changes between said RW and SR modes during flight of the aircraft, with the rotor having a collective pressure ratio set point and a reduced lift state and with the aircraft having a controlled aircraft response during flight under the control law system, comprising:
mechanical collective control law signal generating means for providing signals giving the pilot single-lever direct lift control, while making available at least substantial cyclic blowing control power during said conversion; for providing signals for angle-of-track de-coupling in rotary wing flight, and for using mechanical collective to augment pneumatic roll control; and for providing signals for automatic gain variations with airspeed and rotor speed, resulting in a unitary set of control laws working in the rotor wing ("RW"), conversion ("CV") and stopped rotor ("SR") modes of the aircraft;
pneumatic collective control law signal generating means associated with said mechanical collective control law signal generating means for generating signals commanding the pneumatic collective as a function of said rotor speed, and, in said RW mode, for making the collective pressure ratio set point a positive value, decreasing but remaining positive in said SR mode, and, during said conversion, for compensating the reduced lift state by an increase in collective blowing;
pitch and roll axes control laws signal generating means associated with said mechanical collective control law signal generating means and said pneumatic collective control law signal generating means for generating signals for essentially producing said aircraft response regardless of flight mode or flight condition by compensating for any undesirable cross-couplings without requiring pilot action, as said flight mode or said flight condition is changed; for implementing a hub moment feedback scheme utilizing a proportional and integral ("P+I") controller, significantly improving its bandwidth; and for providing limits to the rotor hub movements protecting the aircraft structure from inadvertent damage; and
pneumatic valving control laws signal generating means associated with said mechanical collective control law signal generating means and said pneumatic collective control law signal generating means for generating signals for controlling the position of the valves for the lowing out of air at the blade edges of the rotor and for providing the pressure required at each valve azimuth location, with automated switching for leading edge blowing ("LEB"), trailing edge blowing ("TEB") and dual edge blowing ("DEB") using a table look-up procedure.

* * * * *

UNITED STATES PATENT AND TRADEMARK OFFICE
CERTIFICATE OF CORRECTION

PATENT NO. : 4,980,835

DATED : December 25, 1990

INVENTOR(S) : Lawrence et al.

It is certified that error appears in the above-identified patent and that said Letters Patent is hereby corrected as shown below:

Col. 1, line 18, delete one "No."

Col. 1, line 21, delete one "No."

Col. 2, line 48, replace "Value" with --Valve--

Col. 2, line 50, replace "Value" with --Valve--

Col. 3, line 30, replace "(+0.3)" with --($\pm$0.3)--

Signed and Sealed this

Twenty-fifth Day of August, 1992

*Attest:*

DOUGLAS B. COMER

*Attesting Officer*  *Acting Commissioner of Patents and Trademarks*